United States Patent
Lou et al.

(10) Patent No.: US 12,413,343 B2
(45) Date of Patent: Sep. 9, 2025

(54) COMMUNICATION METHOD AND APPARATUS

(71) Applicant: HUAWEI TECHNOLOGIES CO., LTD., Shenzhen (CN)

(72) Inventors: Chong Lou, Shanghai (CN); Qiang Fan, Shanghai (CN); Qufang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 17/896,175

(22) Filed: Aug. 26, 2022

(65) Prior Publication Data
US 2023/0006777 A1    Jan. 5, 2023

Related U.S. Application Data

(63) Continuation of application No. PCT/CN2021/078432, filed on Mar. 1, 2021.

(30) Foreign Application Priority Data

Feb. 28, 2020   (CN) .......................... 202010130397.1
Feb. 25, 2021   (CN) .......................... 202110215182.4

(51) Int. Cl.
  *H04L 5/00*   (2006.01)
  *H04L 1/1812*   (2023.01)
(52) U.S. Cl.
  CPC .......... *H04L 1/1812* (2013.01); *H04L 5/0055* (2013.01)
(58) Field of Classification Search
  CPC ... H04L 1/1812; H04L 1/1825; H04L 1/1829; H04L 1/1854; H04L 1/1864;
  (Continued)

(56) References Cited

U.S. PATENT DOCUMENTS 9,042,327 B2 * 5/2015 Yang ..................... H04L 1/1607
                                                         455/450
2014/0092786 A1 * 4/2014 He .......................... H04L 43/16
                                                         370/280
(Continued)

FOREIGN PATENT DOCUMENTS

CN    107534527 A    1/2018
CN    109565366 A    4/2019
(Continued)

OTHER PUBLICATIONS

3GPP, "Technical Specification Group Radio Access Network; NR; Physical layer procedures for control (Release 15)", 3GPP TS 38.213 V15.8., Jan. 11, 2020, total 107 pages.
(Continued)

*Primary Examiner* — Robert J Lopata
(74) *Attorney, Agent, or Firm* — HAUPTMAN HAM, LLP

(57) ABSTRACT

A communication method and an apparatus includes a network device sends first information to a terminal device, so that the terminal device can determine a HARQ feedback manner based on the first information, where the HARQ feedback manner includes skipping ACK feedback and/or NACK feedback. In this manner, the network device controls the HARQ feedback manner used by the terminal device, so that the terminal device can be flexibly controlled to use different HARQ feedback manners in different scenarios, to adapt to a service constraint, effectively reduce power consumption of the terminal device, and save air interface resources.

19 Claims, 15 Drawing Sheets

(58) Field of Classification Search
CPC ... H04L 1/1887; H04L 1/1893; H04L 1/1896; H04L 5/0053; H04L 5/0055
See application file for complete search history.

(56) References Cited

U.S. PATENT DOCUMENTS

| | | | | |
|---|---|---|---|---|
| 2016/0100422 | A1* | 4/2016 | Papasakellariou | H04L 1/1822 370/329 |
| 2016/0261391 | A1* | 9/2016 | Chen | H04L 1/1861 |
| 2017/0303241 | A1* | 10/2017 | Yang | H04L 5/001 |
| 2019/0313380 | A1 | 10/2019 | Ye | |
| 2019/0349973 | A1* | 11/2019 | Yang | H04W 72/23 |
| 2020/0044792 | A1* | 2/2020 | Vaidya | H04L 47/34 |
| 2020/0396760 | A1* | 12/2020 | Yi | H04W 72/23 |
| 2022/0263608 | A1* | 8/2022 | Wei | H04L 1/1854 |
| 2022/0286235 | A1* | 9/2022 | Ranta-Aho | H04L 1/1896 |
| 2022/0287011 | A1* | 9/2022 | Liu | H04L 1/1822 |
| 2022/0376844 | A1* | 11/2022 | Muruganathan | H04W 72/23 |
| 2022/0393803 | A1* | 12/2022 | Chen | H04L 1/1812 |

FOREIGN PATENT DOCUMENTS

| | | | | |
|---|---|---|---|---|
| CN | 109716694 | A | | 5/2019 |
| CN | 110830184 | A | | 2/2020 |
| CN | 110890943 | A | | 3/2020 |
| CN | 112399588 | A | | 2/2021 |
| EP | 2978256 | A1 | * | 1/2016 ............... H04J 3/16 |
| EP | 3334122 | A1 | | 6/2018 |
| EP | 3614600 | A1 | | 2/2020 |
| WO | WO-2018206398 | A1 | * | 11/2018 ........... H04L 1/1635 |
| WO | WO-2021028016 | A1 | * | 2/2021 ........... H04L 1/1825 |

OTHER PUBLICATIONS

Nokia et al, "On remaining details of BWPs and CA", 3GPP TSG-RAN WG1 Meeting #94; R1-1808953, Jan. 11, 2020, total 9 pages.

3GPP TSG-RAN WG2 #105 Tdoc R2-1901298,DL SPS enhancements for NR-IIoT, Ericsson, Athens, Greece, Feb. 25 Mar. 1, 2019, total 3 pages.

International Search Report issued in corresponding International Application No. PCT/CN2021/078432, dated Apr. 15, 2021, pp. 1-12.

Chinese Office Action issued in corresponding Chinese Application No. 202110215182.4, dated Jul. 27, 2024, pp. 1-10.

OPPO: "Discussion on CG and SPS in NTN", 3GPP Draft; R2-1915166, Nov. 18-22, 2019, total 3 pages.

* cited by examiner

COMMUNICATION METHOD AND APPARATUS

CROSS-REFERENCE TO RELATED APPLICATIONS

This application is a continuation of International Application No. PCT/CN2021/078432, filed on Mar. 1, 2021, which claims priority to Chinese Patent Application No. 202010130397.1, filed on Feb. 28, 2020 and Chinese Patent Application No. 202110215182.4, filed on Feb. 25, 2021. The disclosures of the aforementioned applications are herein incorporated in entirety by reference.

BACKGROUND

In wireless communication, a transmitted signal needs to pass through a complex propagation environment. To ensure signal transmission quality, a hybrid automatic repeat request (HARQ) is introduced.

The HARQ is a technology that combines a forward error correction (FEC) method and an automatic repeat request (ARQ) method. In FEC, redundant information is added, so that a receive end corrects a part of errors, to reduce a quantity of retransmissions. For an error that is unable to be corrected through the FEC, the receive end requests, by using an ARQ mechanism, a transmit end to retransmit data. The receive end is configured to use an error detection code to detect whether a received data packet is successfully decoded. If the decoding succeeds, the receive end sends an acknowledgement (ACK) to the transmit end. After receiving the ACK, the transmit end sends a next data packet. If the decoding fails, the receive end sends a negative acknowledgement (NACK) to the transmit end. After receiving the NACK, the transmit end retransmits same data.

However, for downlink transmission, how a terminal device performs HARQ feedback to reduce power consumption of the terminal device still needs to be further studied currently.

SUMMARY

Some embodiments provide a communication method and an apparatus, to implement flexible HARQ feedback, and to adapt to service constraints in different scenarios, reduce HARQ feedback overheads, and reduce power consumption of a terminal device.

According to a first aspect, an embodiment of this application provides a communication method. The method is applied to a terminal device, or is applied to a chip inside the terminal device. For example, the method is applied to the terminal device. In this method, the terminal device receives first information from a network device, and determines a HARQ feedback manner based on the first information, where the HARQ feedback manner includes skipping ACK feedback and/or NACK feedback. The terminal device performs feedback processing for a first HARQ process based on the HARQ feedback manner.

In this manner, the network device controls the HARQ feedback manner used by the terminal device, so that the terminal device can be flexibly controlled to use different HARQ feedback manners in different scenarios, to adapt to a service constraint, effectively reduce power consumption of the terminal device, and save air interface resources.

In a possible design, that the terminal device performs feedback processing for a first HARQ process based on the HARQ feedback manner includes: When the HARQ feedback manner includes skipping ACK feedback, and if the terminal device receives a data packet from the first HARQ process and the data packet is successfully decoded, the terminal device skips feeding back, for the data packet, an ACK to the first HARQ process. Alternatively, when the HARQ feedback manner includes skipping NACK feedback, and if the terminal device receives a data packet from the first HARQ process and the data packet fails to be decoded, the terminal device skips feeding back, for the data packet, a NACK to the first HARQ process; or if the terminal device does not receive a data packet from the first HARQ process, the terminal device skips feeding back a NACK to the first HARQ process. Alternatively, when the HARQ feedback manner includes skipping ACK feedback and NACK feedback, the terminal device skips feeding back, for a data packet, an ACK and a NACK to the first HARQ process.

In a possible design, that the data packet is successfully decoded includes: At least one CBG in the data packet is successfully decoded. In this case, feeding back the ACK or skipping feeding back the ACK for the data packet means feeding back the ACK or skipping feeding back the ACK for the successfully decoded CBG.

In a possible design, that the data packet fails to be decoded includes: At least one CBG in the data packet fails to be decoded. In this case, feeding back the NACK or skipping feeding back the NACK for the data packet means feeding back the NACK or skipping feeding back the NACK for the CBG that fails to be decoded.

In a possible design, the first information includes indication information, and the indication information indicates the HARQ feedback manner.

In a possible design, the first HARQ process is a HARQ process corresponding to an SPS resource. That the terminal device receives indication information from a network device includes: The terminal device receives an RRC message from the network device, where the RRC message includes the indication information, and the RRC message is for configuring the SPS resource. Alternatively, the terminal device receives DCI from the network device, where the DCI includes the indication information, and the DCI is for activating or reactivating the SPS resource.

In a possible design, the first HARQ process is a HARQ process corresponding to a dynamic scheduling resource. That the terminal device receives indication information from a network device includes: The terminal device receives DCI from the network device, where the DCI includes the indication information, and the DCI is for scheduling the dynamic scheduling resource.

In a possible design, that the terminal device receives indication information from a network device includes: The terminal device receives a first message from the network device, where the first message includes the indication information. The first message is a PDCP layer control message, an RLC layer control message, a MAC layer control message, or a physical layer control message.

In a possible design, that the terminal device receives indication information from a network device includes: The terminal device receives a data packet from the network device, where the data packet includes the indication information. The data packet is sent by using the first HARQ process.

In a possible design, the first HARQ process is a HARQ process corresponding to a first service. That the terminal device receives indication information from a network device includes: The terminal device receives an RRC message from the network device, where the RRC message includes the indication information, and the RRC message is for configuring a logical channel corresponding to the first service.

In a possible design, the first HARQ process is a HARQ process corresponding to an SPS resource. The first information includes an RRC message, the RRC message is for configuring a PUCCH resource, and the PUCCH resource is for carrying feedback information for the HARQ process corresponding to the SPS resource. That the terminal device determines a HARQ feedback manner based on the first information includes: The terminal device determines the HARQ feedback manner depending on whether the RRC message carries configuration information of the PUCCH resource.

In a possible design, the first information includes DCI. That the terminal device determines a HARQ feedback manner based on the first information includes: determining the HARQ feedback manner based on a DCI format or a DCI scrambling manner.

In this manner, the HARQ feedback manner is determined by using the DCI format or the DCI scrambling manner, so that no other additional information needs to be used for indication, and resources can be effectively saved.

In a possible design, the first HARQ process is a HARQ process corresponding to an SPS resource, and DCI indicates to activate or reactivate the SPS resource. Alternatively, the first HARQ process is a HARQ process corresponding to a dynamic scheduling resource, and DCI is for scheduling the dynamic scheduling resource.

In a possible design, the first HARQ process is a HARQ process corresponding to a first service, and the first information includes preset priority information. That the terminal device determines a HARQ feedback manner includes: The terminal device determines the HARQ feedback manner based on a priority of a logical channel corresponding to the first service and the preset priority information.

In a possible design, the method further includes: The terminal device receives second information from the network device, where the second information indicates at least one HARQ process to which the HARQ feedback manner is applicable, and the at least one HARQ process includes the first HARQ process.

According to a second aspect, an embodiment of this application provides a communication method. The method is applied to a network device, or is applied to a chip inside the network device. For example, the method is applied to the network device. In this method, the network device determines a HARQ feedback manner, and sends first information to a terminal device, where the first information is used by the terminal device to determine the HARQ feedback manner, and the HARQ feedback manner includes skipping ACK and/or NACK.

In this manner, the network device controls, by using the first information, the HARQ feedback manner used by the terminal device, so that flexible HARQ feedback of the terminal device can be implemented, thereby effectively reducing power consumption of the terminal device and saving air interface resources.

In a possible design, the first information includes indication information, and the indication information indicates the HARQ feedback manner.

In a possible design, that the network device sends indication information to a terminal device includes: The network device sends an RRC message to the terminal device, where the RRC message includes the indication information, and the RRC message is for configuring an SPS resource. Alternatively, the network device sends DCI to the terminal device, where the DCI includes the indication information, and the DCI is for activating or reactivating an SPS resource.

In a possible design, that the network device sends indication information to a terminal device includes: The network device sends DCI to the terminal device, where the DCI includes the indication information, and the DCI is for scheduling a dynamic scheduling resource.

In a possible design, that the network device sends indication information to a terminal device includes: The network device sends a first message to the terminal device, where the first message includes the indication information. The first message is a PDCP layer control message, an RLC layer control message, a MAC layer control message, or a physical layer control message.

In a possible design, that the network device sends indication information to a terminal device includes: The network device sends a data packet to the terminal device, where the data packet includes the indication information.

In a possible design, that the network device sends indication information to a terminal device includes: The network device sends an RRC message to the terminal device, where the RRC message includes the indication information, and the RRC message is for configuring a logical channel corresponding to a first service.

In a possible design, the first information includes an RRC message, the RRC message is for configuring a PUCCH resource, and the PUCCH resource is for carrying feedback information for a HARQ process corresponding to an SPS resource. When the RRC message does not carry configuration information of the PUCCH resource, the RRC message indicates the HARQ feedback manner.

In a possible design, the first information includes DCI, and a DCI format or a DCI scrambling manner is for indicating the HARQ feedback manner.

In a possible design, the DCI indicates to activate or reactivate an SPS resource, or the DCI is for scheduling a dynamic scheduling resource.

In a possible design, the first information includes preset priority information.

In a possible design, the method further includes: The network device sends second information to the terminal device, where the second information indicates at least one HARQ process to which the HARQ feedback manner is applicable.

According to a third aspect, an embodiment of this application provides a communication method. The method is applied to a terminal device, or is applied to a chip inside the terminal device. For example, the method is applied to the terminal device. In this method, the terminal device receives configuration information from a network device, where the configuration information is for configuring a first SPS resource and a first HARQ resource corresponding to the first SPS resource; determines that feedback information for a HARQ process corresponding to the first SPS resource is unable to be sent on the first HARQ resource; and the terminal device is in DRX active mode in a first time period, and a start moment of the first time period is determined based on the first SPS resource.

According to the foregoing method, when the feedback information is unable to be sent on the first HARQ resource corresponding to the first SPS resource, the terminal device is in DRX active mode in the first time period, to receive, in a timely manner, DCI that is sent by the network device and that indicates a retransmission resource for the feedback information, so that the feedback information for the HARQ process corresponding to the first SPS resource can be sent to the network device in a timely manner, to improve downlink transmission efficiency.

In a possible design, the method further includes: receiving DCI from the network device, where the DCI indicates a second HARQ resource, the second HARQ resource is for carrying the feedback information, and an end moment of the first time period is a receiving moment of the DCI.

In a possible design, that the terminal device is in DRX active mode in a first time period includes: entering DRX active mode at the start moment of the first time period, and entering DRX dormant mode at the end moment of the first time period.

In a possible design, that the terminal device is in DRX active mode in a first time period includes: starting a timer corresponding to the HARQ process at the start moment of the first time period, and stopping the timer at the end moment of the first time period, where the terminal device is in DRX active mode while the timer is running In a possible design, the timer is an uplink DRX retransmission timer.

In a possible design, the method further includes: determining that a PDSCH is successfully received on the first SPS resource.

In a possible design, that a start moment of the first time period is determined based on the first SPS resource includes: The start moment of the first time period is determined based on a time domain resource occupied by the PDSCH received on the first SPS resource.

In a possible design, the start moment of the first time period is any one of the following moments: a start moment of the time domain resource occupied by the PDSCH; a moment obtained by translating, by m time units, the start moment of the time domain resource occupied by the PDSCH; an end moment of the time domain resource occupied by the PDSCH; and a moment obtained by translating, by n time units, the end moment of the time domain resource occupied by the PDSCH, where m and n are integers.

In a possible design, a HARQ feedback manner for the HARQ process is skipping NACK feedback.

In a possible design, that the terminal device determines that HARQ feedback information is unable to be sent on the first HARQ resource includes: determining that the first HARQ resource and a first resource overlap, where the first resource is for transmitting downlink information; or determining that the first HARQ resource and a second resource overlap, where the second resource is for transmitting uplink information, and a priority of the HARQ feedback information is lower than a priority of the uplink information.

According to a fourth aspect, an embodiment of this application provides a communication method. The method is applied to a network device, or is applied to a chip inside the network device. For example, the method is applied to the network device. In this method, the network device sends configuration information to a terminal device, where the configuration information is for configuring a first SPS resource and a first HARQ resource corresponding to the first SPS resource; determines that feedback information for a HARQ process corresponding to the first SPS resource is unable to be received on the first HARQ resource; and sends DCI to the terminal device, where the DCI indicates a dynamic scheduling resource, where the dynamic scheduling resource and the first SPS resource overlap.

In the foregoing manner, when the network device determines that the feedback information for the HARQ process corresponding to the first SPS resource is unable to be received on the first HARQ resource, the network device indicates, to the terminal device, the dynamic scheduling resource that overlaps the first SPS resource. The network device flexibly indicates a HARQ resource corresponding to the dynamic scheduling resource, so that a problem that the terminal device is unable to send the feedback information to the network device in a timely manner can be effectively avoided, thereby improving downlink transmission efficiency.

In a possible design, the DCI further indicates a third HARQ resource, and the third HARQ resource is for carrying feedback information for a HARQ process corresponding to the dynamic scheduling resource.

In a possible design, that the network device determines that feedback information for a HARQ process corresponding to the first SPS resource is unable to be received on the first HARQ resource includes: determining that the first HARQ resource and a first resource overlap, where the first resource is for transmitting downlink information; or determining that the first HARQ resource and a second resource overlap, where the second resource is for transmitting uplink information, and a priority of the HARQ feedback information is lower than a priority of the uplink information.

According to a fifth aspect, this application provides a communication apparatus. The communication apparatus is a terminal device or a chip disposed inside the terminal device. The communication apparatus has a function of implementing the first aspect or the third aspect. For example, the communication apparatus includes corresponding modules, units, or means for performing the steps in the first aspect or the third aspect. The functions, the units, or the means are implemented by software or hardware, or are implemented by hardware by executing corresponding software.

In a possible design, the communication apparatus includes a processing unit and a communication unit. The communication unit is configured to receive and send a signal, to implement communication between the communication apparatus and another apparatus. For example, the communication unit is configured to receive configuration information from a network device. The processing unit is configured to perform some internal operations of the communication apparatus. Functions performed by the processing unit and the communication unit corresponds to the steps in the first aspect or the third aspect.

In a possible design, the communication apparatus includes a processor, and further includes a transceiver. The transceiver is configured to receive and send a signal, and the processor executes program instructions, to complete the method according to any one of the possible designs or implementations in the first aspect or the third aspect. The communication apparatus further includes one or more memories. The memory is configured to be coupled to the processor. The one or more memories are integrated with the processor, or are disposed independent of the processor. This is not limited in this application. The memory stores a computer program or instructions for implementing the functions in the first aspect or the third aspect. The processor may execute the computer program or the instructions stored in the memory. When the computer program or the instructions are executed, the communication apparatus is enabled to implement the method according to any one of the possible designs or implementations in the first aspect or the third aspect.

In a possible design, the communication apparatus includes a processor and a memory. The memory stores a computer program or instructions for implementing the functions in the first aspect or the third aspect. The processor may execute the computer program or the instructions stored in the memory. When the computer program or the instructions are executed, the communication apparatus is enabled to implement the method according to any one of the possible designs or implementations in the first aspect or the third aspect.

In a possible design, the communication apparatus includes at least one processor and an interface circuit. The at least one processor is configured to communicate with another apparatus through the interface circuit, and perform the method according to any one of the possible designs or implementations in the first aspect or the third aspect.

According to a sixth aspect, this application provides a communication apparatus. The communication apparatus is a network device or a chip disposed inside the network device. The communication apparatus has a function of implementing the second aspect or the fourth aspect. For example, the communication apparatus includes corresponding modules, units, or means for performing the steps in the second aspect or the fourth aspect. The functions, the units, or the means are implemented by software or hardware, or are implemented by hardware by executing corresponding software.

In a possible design, the communication apparatus includes a processing unit and a communication unit. The communication unit is configured to receive and send a signal, to implement communication between the communication apparatus and another apparatus. For example, the communication unit is configured to send system information to a terminal device. The processing unit is configured to perform some internal operations of the communication apparatus. Functions performed by the processing unit and the communication unit corresponds to the steps in the second aspect or the fourth aspect.

In a possible design, the communication apparatus includes a processor, and further includes a transceiver. The transceiver is configured to receive and send a signal, and the processor executes program instructions, to complete the method according to any one of the possible designs or implementations in the second aspect or the fourth aspect. The communication apparatus further includes one or more memories. The memory is configured to be coupled to the processor. The one or more memories are integrated with the processor, or are disposed independent of the processor. This is not limited in this application. The memory stores a computer program or instructions for implementing the functions in the second aspect or the fourth aspect. The processor may execute the computer program or the instructions stored in the memory. When the computer program or the instructions are executed, the communication apparatus is enabled to implement the method according to any one of the possible designs or implementations in the second aspect or the fourth aspect.

In a possible design, the communication apparatus includes a processor and a memory. The memory stores a computer program or instructions for implementing the functions in the second aspect or the fourth aspect. The processor may execute the computer program or the instructions stored in the memory. When the computer program or the instructions are executed, the communication apparatus is enabled to implement the method according to any one of the possible designs or implementations in the second aspect or the fourth aspect.

In a possible design, the communication apparatus includes at least one processor and an interface circuit. The at least one processor is configured to communicate with another apparatus through the interface circuit, and perform the method according to any one of the possible designs or implementations in the second aspect or the fourth aspect.

According to a seventh aspect, this application provides a computer-readable storage medium. The computer storage medium stores computer-readable instructions. When a computer reads and executes the computer-readable instructions, the computer is enabled to perform the method according to any one of the possible designs in the first aspect or the second aspect.

According to an eighth aspect, this application provides a computer program product. When a computer reads and executes the computer program product, the computer is enabled to perform the method according to any one of the possible designs in the first aspect to the fourth aspect.

According to a ninth aspect, this application provides a chip. The chip includes a processor. The processor is coupled to a memory, and is configured to read and execute a software program stored in the memory, to implement the method according to any one of the possible designs in the first aspect to the fourth aspect.

These aspects or other aspects of this application are clearer and more comprehensible in descriptions of the following embodiments.

DESCRIPTION OF EMBODIMENTS

Figure 1A:
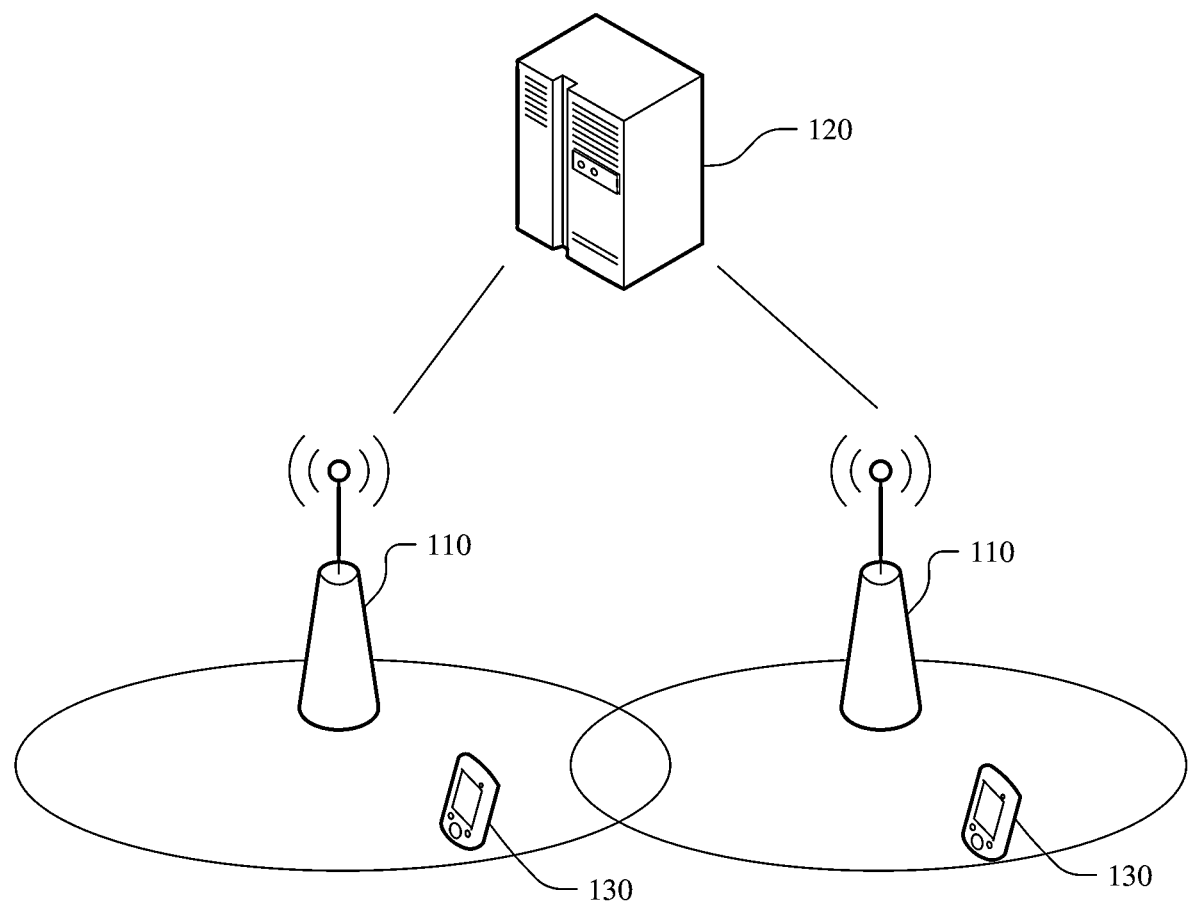
FIG. 1a is a schematic diagram of a possible system architecture, in accordance with some embodiments, in accordance with some embodiments.

The following describes the technical solutions in some embodiments with reference to the accompanying drawings in some embodiments. The described embodiments are some rather than all the embodiments.

Some terms in some embodiments are first described, to help a person skilled in the art have a better understanding.

(1) Terminal device: The terminal device is a wireless terminal device that can receive scheduling information and indication information of a network device. The wireless terminal device is a device that provides voice and/or data connectivity for a user, a handheld device with a wireless connection function, or another processing device connected to a wireless modem. The terminal device communicates with one or more core networks or the Internet through a radio access network (RAN). The terminal device is a mobile terminal device, for example, a mobile phone (or referred to as a "cellular" phone or a mobile phone), a computer, and a data card. For example, the terminal device is a portable, pocket-sized, handheld, computer built-in, or vehicle-mounted mobile apparatus that exchanges voice and/or data with the radio access network. For example, the terminal device is a personal communications service (PCS) phone, a cordless phone, a session initiation protocol (SIP) phone, a wireless local loop (WLL) station, a personal digital assistant (PDA), a tablet computer (Pad), or a computer having wireless receiving and sending functions. The wireless terminal device alternatively is referred to as a system, a subscriber unit (subscriber unit), a subscriber station (subscriber station), a mobile station (MS), a remote station (remote station), an access point (AP), a remote terminal (remote terminal) device, an access terminal (access terminal) device, a user terminal (user terminal) device, a user agent (user agent), a subscriber station (SS), customer premises equipment (CPE), a terminal (terminal), user equipment (UE), a mobile terminal (MT), or the like. Alternatively, the terminal device is a wearable device, a terminal device in a next-generation communication system, for example, a 5G communication system, a terminal device in a future evolved public land mobile network (PLMN), or the like.

(2) Network device: The network device is a device in a wireless network. For example, the network device is a radio access network (RAN) node (or device) that enables a terminal device to access the wireless network, and further is referred to as a base station. Currently, some examples of the RAN device are: a next-generation NodeB (gNodeB) in a 5G communication system, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), or the like. In addition, in a network structure, the network device includes a centralized unit (CU) node, a distributed unit (DU) node, or a RAN device including a CU node and a DU node. In addition, in another possible case, the network device is another apparatus that provides a wireless communication function for the terminal device. A technology and a device form that are used by the network device are not limited. For ease of description, in some embodiments, an apparatus that provides a wireless communication function for a terminal device is referred to as a network device.

(3) The terms "system" and "network" is used interchangeably in some embodiments. "At least one" means one or more, and "a plurality of" means two or more. The term "and/or" describes an association relationship between associated objects and represents that three relationships exists. For example, A and/or B represents the following cases: A exists, both A and B exist, and B exists, where A and B is singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, "at least one of A, B, and C" includes A, B, C, AB, AC, BC, or ABC. In addition, unless otherwise stated, ordinal numbers such as "first" and "second" in some embodiments are used to distinguish between a plurality of objects, and are not used to limit an order, a time sequence, priorities, or importance of the plurality of objects.

FIG. 1*a* is a schematic diagram of a network architecture, in accordance with some embodiments. As shown in FIG. 1*a*, a terminal device 130 accesses a wireless network, to access a service of an external network (for example, the Internet) through the wireless network, or communicate with another device through the wireless network, for example, communicates with another terminal device. The wireless network includes a radio access network (RAN) device 110 and a core network (CN) device 120. The RAN device 110 is configured to enable the terminal device 130 to access the wireless network, and the CN device 120 is configured to manage the terminal device and provide a gateway for communicating with the external network. Quantities of devices in the communication system shown in FIG. 1*a* are used as an example. Some embodiments are not limited thereto. During actual application, the communication system further includes more terminal devices 130 and more RAN devices 110, and further includes another device.

A CN includes a plurality of CN devices 120. When the network architecture shown in FIG. 1*a* is applicable to a 5G communication system, the CN device 120 is an access and mobility management function (AMF) entity, a session management function (SMF) entity, a user plane function (UPF) entity, or the like. In some embodiments, the CN device 120 is the UPF entity. For example, an interface between the terminal device 130 and the RAN device 110 is referred to as a Uu interface or an air interface, and an interface between the RAN device 110 and the UPF entity is referred to as an N3 interface.

Figure 1B:
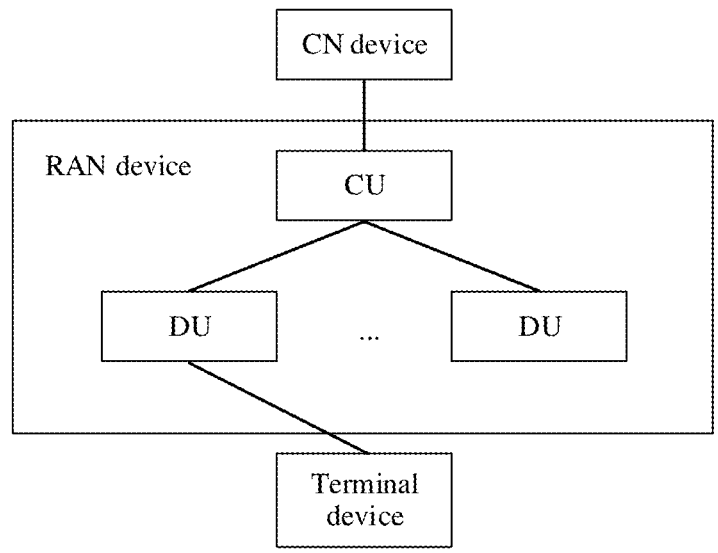
FIG. 1b is a schematic diagram of another network architecture, in accordance with some embodiments.

FIG. 1*b* is a schematic diagram of another network architecture, in accordance with some embodiments. As shown in FIG. 1*b*, the network architecture includes a CN device, a RAN device, and a terminal device. The RAN device includes a baseband apparatus and a radio frequency apparatus. The baseband apparatus is implemented by one node, or is implemented by a plurality of nodes. The radio frequency apparatus is independently implemented remotely from the baseband apparatus, or is integrated into the baseband apparatus, or a part of the radio frequency apparatus is implemented remotely from the baseband apparatus and a remaining part is integrated into the baseband apparatus. For example, in an LTE communication system, a RAN device (eNB) includes a baseband apparatus and a radio frequency apparatus. The radio frequency apparatus is remotely disposed relative to the baseband apparatus. For example, a remote radio unit (RRU) is remotely disposed relative to a BBU. For another example, in an evolved structure, a RAN device includes a CU and a DU, a plurality of DUs are centrally controlled by one CU, and an interface between the CU and the DU is referred to as an F1-U interface.

Figure 1C:
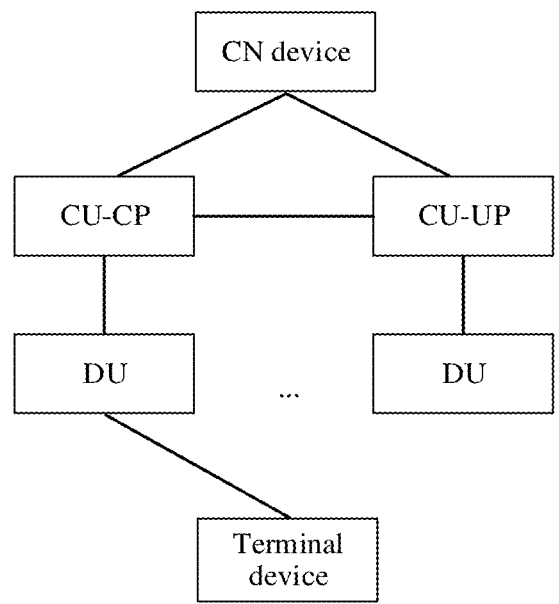
FIG. 1c is a schematic diagram of another network architecture, in accordance with some embodiments.

FIG. 1c is a schematic diagram of another network architecture, in accordance with some embodiments. Compared with the network architecture shown in FIG. 1b, in FIG. 1c, a control plane (CP) and a user plane (UP) of a CU further is split and implemented as different entities: a control plane (CP) CU entity (namely, a CU-CP entity) and a user plane (UP) CU entity (namely, a CU-UP entity).

In the foregoing network architecture, signaling generated by the CU is sent to a terminal device through a DU, or signaling generated by a terminal device is sent to the CU through a DU. The DU transparently transmits the signaling to the terminal device or the CU by directly encapsulating the signaling at a protocol layer without parsing the signaling. In the following embodiments, if transmission of such signaling between the DU and the terminal device is involved, sending, or receiving of the signaling by the DU includes this scenario. For example, radio resource control (RRC) layer signaling or packet data convergence protocol (PDCP) layer signaling is finally processed as physical layer signaling and sent to the terminal device or is converted from received physical layer signaling. In this architecture, the RRC layer signaling or the PDCP layer signaling is sent by the DU, or sent by the DU and a radio frequency apparatus.

The network architecture shown in FIG. 1a, FIG. 1b, or FIG. 1c is applicable to communication systems of various radio access technologies (RATs). For example, the communication system is a 5G (or referred to as new radio (NR)) communication system, or certainly be a future communication system. Network architectures and service scenarios described in some embodiments are intended to describe the technical solutions more clearly, and do not constitute any limitation on the technical solutions provided. A person of ordinary skill in the art knows, with evolution of the communication network architecture and emergence of new service scenarios, the technical solutions provided are further applicable to resolving similar technical problems.

In some embodiments, an apparatus i is in a terminal device or a network device based on a function implemented by the apparatus. When the foregoing CU-DU structure is used, the network device is a CU, a DU, or a RAN device including a CU and a DU.

In the network architecture shown in FIG. 1a, FIG. 1b, or FIG. 1c, communication between the network device and the terminal device complies with a protocol layer structure. For example, a control plane protocol layer structure includes functions of protocol layers such as an RRC layer, a PDCP layer, a radio link control (RLC) layer, a media access control (MAC) layer, and a physical layer (PHY); and a user plane protocol layer structure includes functions of protocol layers such as the PDCP layer, the RLC layer, the MAC layer, and the physical layer. In a possible implementation, a service data adaptation protocol (SDAP) layer is further included above the PDCP layer. For example, the network device implements the functions of the protocol layers such as the RRC layer, the PDCP layer, the RLC layer, and the MAC layer through one node or a plurality of nodes. For example, if the network device includes a CU and a DU, the CU and the DU is obtained through division based on a protocol layer of a wireless network. For example, functions of the PDCP layer and a protocol layer above the PDCP layer are set on the CU, and functions of protocol layers below the PDCP layer, such as the RLC layer and the MAC layer, are set on the DU. Division based on the protocol layer is an example, and division alternatively is performed based on another protocol layer, for example, based on the RLC layer. Functions of the RLC layer and a layer above the RLC layer are set on the CU, and functions of protocol layers below the RLC layer are set on the DU. Alternatively, division is performed at a protocol layer. For example, some functions of the RLC layer and a function of a protocol layer above the RLC layer are set on the CU, and a remaining function of the RLC layer and functions of protocol layers below the RLC layer are set on the DU. In addition, division alternatively is performed in another manner. For example, division is performed based on a delay. A function whose processing time needs to meet a delay constraint is set on the DU, and a function whose processing time does not need to meet the delay constraint is set on the CU.

Figure 2A:
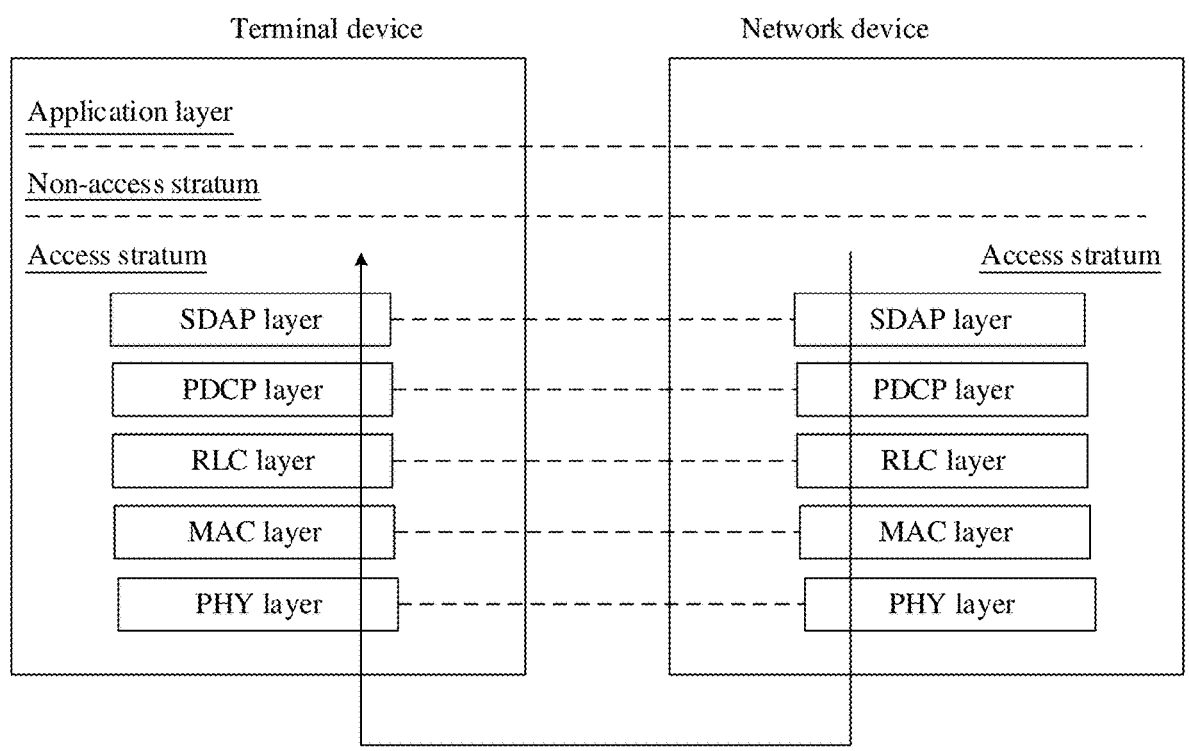
FIG. 2a is a schematic diagram of downlink data transmission between layers, in accordance with some embodiments, in accordance with some embodiments.

Data transmission between the network device and the terminal device is used as an example. Data transmission needs to pass through a user plane protocol layer, for example, the SDAP layer, the PDCP layer, the RLC layer, the MAC layer, and the physical layer. The SDAP layer, the PDCP layer, the RLC layer, the MAC layer, and the physical layer further is collectively referred to as an access stratum. Because a data transmission direction is divided into sending and receiving, each layer is further divided into a sending part and a receiving part. Downlink data transmission is used as an example. FIG. 2a is a schematic diagram of downlink data transmission between layers. In FIG. 2a, a downward arrow represents data sending, and an upward arrow represents data receiving. After obtaining data from an upper layer, a PDCP layer transmits the data to an RLC layer and a MAC layer, the MAC layer generates a transport block (TB), and then wireless transmission is performed through a physical layer. Data is correspondingly encapsulated at each layer. Data received by a layer from an upper layer of the layer is considered as a service data unit (SDU) of the layer. After being encapsulated at the layer, the data becomes a protocol data unit (PDU), and is then transferred to a next layer. For example, data received by the PDCP layer from an upper layer is referred to as a PDCP SDU, and data sent by the PDCP layer to a lower layer is referred to as a PDCP PDU. Data received by the RLC layer from an upper layer is referred to as an RLC SDU, and data sent by the RLC layer to a lower layer is referred to as an RLC PDU. Data received by the MAC layer from an upper layer is referred to as a MAC SDU, and data sent by the MAC layer to a lower layer is referred to as a MAC PDU. The MAC PDU further is referred to as the TB. In a protocol, the layers correspond to each other mostly through a channel The RLC layer corresponds to the MAC layer through a logical channel (LCH), the MAC layer corresponds to the physical layer through a transport channel (transport channel), and the physical layer corresponds to a physical layer at another end through a physical channel (physical channel).

It can be further learned from FIG. 2a that the terminal device is further configured to have an application layer and a non-access stratum. The application layer is used to provide a service for an application program installed on the terminal device. For example, downlink data received by the terminal device is sequentially transmitted from the physical layer to the application layer, and then the application layer provides the downlink data for the application program. The non-access stratum is used to forward user data. For example, the non-access stratum forwards uplink data received from the application layer to the SDAP layer, or forwards downlink data received from the SDAP layer to the application layer.

Figure 2B:
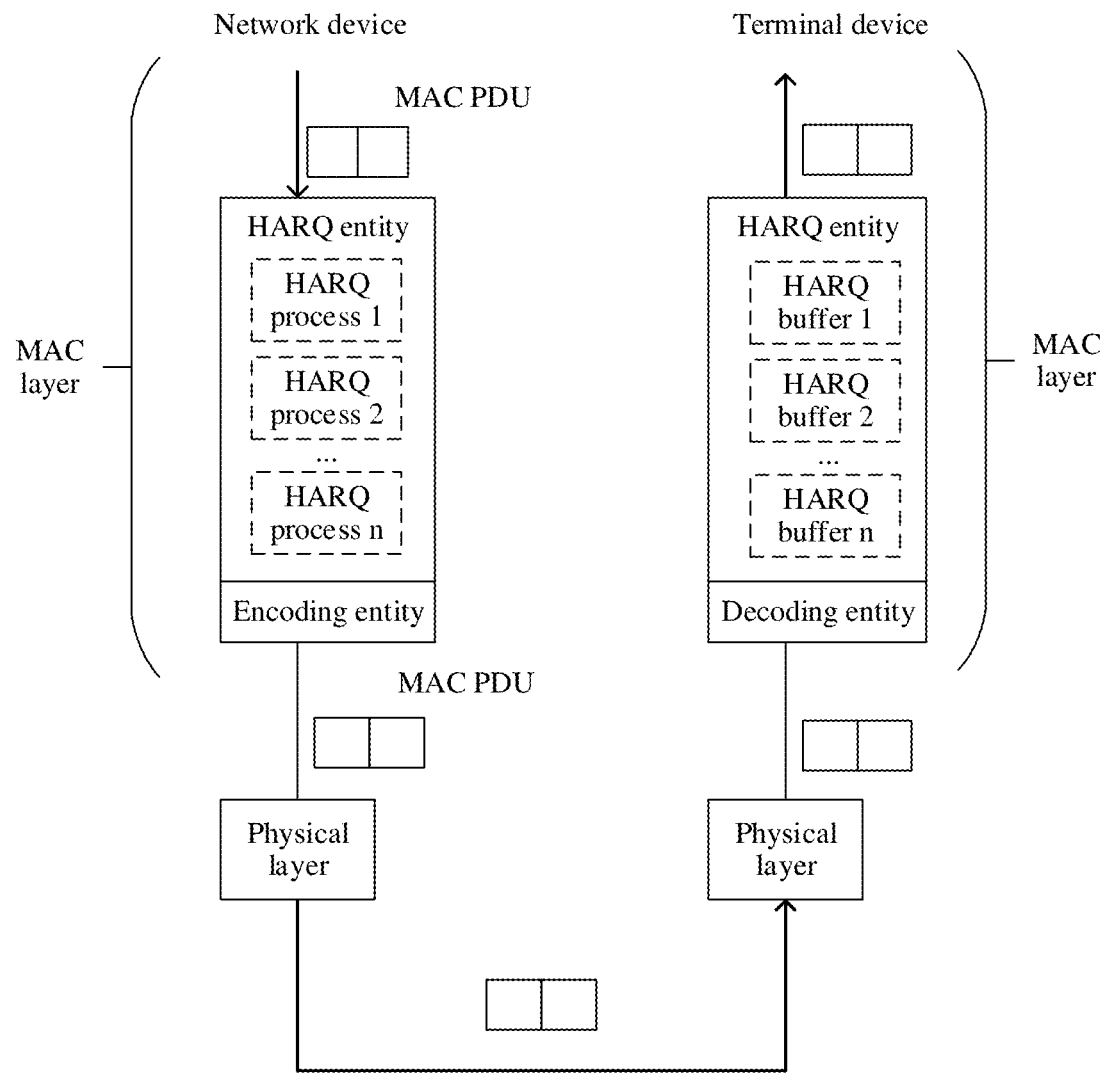
FIG. 2b is a schematic diagram of downlink data transmission between a network device and a terminal device, in accordance with some embodiments, in accordance with some embodiments.

The downlink data transmission shown in FIG. 2a is still used as an example. Refer to FIG. 2b. A MAC layer of a network device includes a HARQ entity (HARQ entity), and one HARQ entity maintains or manages one or more HARQ processes (HARQ processes), for example, HARQ process 1, HARQ process 2, . . . , and HARQ process n. Each HARQ process has an independent HARQ buffer (buffer) at a receive end (namely, a terminal device), for example, HARQ buffer 1, HARQ buffer 2, . . . , and HARQ buffer n. HARQ buffer 1 is a HARQ buffer of HARQ process 1, HARQ buffer 2 is a HARQ buffer of HARQ process 2, and the rest is deduced by analogy.

The HARQ process sends data based on a stop-and-wait protocol (stop-and-wait protocol), and therefore further is referred to as a stop-and-wait process (stop-and-wait process). In the stop-and-wait protocol, after sending a TB, a transmit end stops to wait for acknowledgement information, and the receive end performs acknowledgement (ACK) or negative acknowledgement (NACK) for the TB. Considering that a throughput is very low because the transmit end stops to wait for an acknowledgement after each transmission, a plurality of parallel HARQ processes are used in an LTE communication system and a 5G communication system. When a HARQ process is waiting for acknowledgement information, the transmit end continues to send data by using another HARQ process. These HARQ processes jointly form a HARQ entity. The HARQ entity is combined with the stop-and-wait protocol to allow continuous transmission of data.

The HARQ buffer corresponding to each HARQ process is used to buffer a data packet that fails to be decoded, so that soft combining is performed on received data. In an HARQ mechanism, after determining that decoding of a received data packet fails, the receive end discards the data packet, and sends a NACK to the transmit end to request retransmission of the data packet. Considering that the data packet that fails to be decoded includes useful information, and if the data packet is discarded, the useful information further is discarded, a HARQ with soft combining (HARQ with soft combining) is used. The receive end stores the received data packet that fails to be decoded in a HARQ buffer, and combine the data packet with a subsequently received and retransmitted data packet, to obtain a data packet that is more reliable than an individually decoded data packet (this is referred to as a "soft combining" process). Then, the receive end decodes the data packet after combining. If the decoding still fails, a process of "requesting retransmission and then performing soft combining" is repeated.

As shown in FIG. 2b, a HARQ process in the network device delivers a MAC PDU (namely, a TB) to an encoding entity, so that the encoding entity performs encoding, and transmits an encoded TB to a physical layer of the network device, and the physical layer transmits the encoded TB to a physical layer of the terminal device. For example, the TB is associated with HARQ information, and the HARQ information is transferred from a physical layer to a MAC layer. The HARQ information includes a new data indicator (NDI), a transport block size (TBS), a redundancy version (RV), and a HARQ process identifier (HARQ process ID). The NDI is for indicating whether a TB is newly transmitted or retransmitted. Each HARQ process stores an NDI value. If, compared with a previous NDI value, an NDI value of a same HARQ process is toggled (NDI toggled), current transmission TB is a newly transmitted TB; or if an NDI value of a same HARQ process is not toggled (NDI not toggled), current transmission is a retransmitted TB. The RV is for indicating a redundancy version used for transmission, where a value range of the RV is 0 to 3. The HARQ process identifier is information for identifying a HARQ process. For example, the HARQ process identifier is a HARQ process number.

Accordingly, after receiving the TB, the physical layer of the terminal device delivers the TB to a decoding entity at a MAC layer, so that the decoding entity performs decoding. If the decoding succeeds, a HARQ entity at the MAC layer is unable to notify the physical layer to feed back an ACK to the HARQ process; or if the decoding fails, a HARQ entity at the MAC layer is unable to notify the physical layer to feed back a NACK to the HARQ process. In addition, if the terminal device does not receive the TB, the HARQ entity at the MAC layer further notifies the physical layer to feed back the NACK to the HARQ process.

With reference to FIG. 2a and FIG. 2b, the foregoing describes a process of the downlink data transmission between the network device and the terminal device. The following describes a resource used for the downlink data transmission.

For example, the network device sends a downlink data packet to the terminal device by using a dynamic scheduling resource, or sends a downlink data packet to the terminal device by using a semi-persistent scheduling resource.

(1) Dynamic Scheduling Resource

When scheduling an uplink dynamic grant (DG), the network device indicates information such as a time-frequency position of a scheduled uplink transmission resource by using downlink control information (DCI) in a physical downlink control channel (PDCCH). This is understood as: The network device schedules a dynamic scheduling resource by using the DCI. For example, the network device is unable to notify, by using the DCI, the terminal device to receive data (for downlink) on a frequency band of YYY at time of XXX, and send data (for uplink) on a frequency band of VVV at time of ZZZ. In other words, the dynamic scheduling resource is a resource for downlink transmission, or is a resource for uplink transmission. In some embodiments, the dynamic scheduling resource is the resource for the downlink transmission used for description.

For example, a resource allocated by the network device based on dynamic scheduling is valid once. In other words, the resource allocated by the network device to the terminal device by using the DG can be used once.

(2) Semi-Persistent Scheduling (SPS) Resource

Semi-persistent scheduling refers to downlink static/semi-persistent scheduling. A configured downlink assignment (configured downlink assignment) configured by the network device is valid for a plurality of times. For example, the network device notifies, by using RRC signaling, MAC signaling, or physical layer signaling, a terminal to receive data on a frequency band of YYY at time of XXX, and then receive data on the frequency band of YYY at the time of XXX at an interval of periodicity T.

For example, the network device configures an SPS resource by using an RRC message, where the RRC message includes parameters such as a periodicity of the SPS resource and a quantity of HARQ processes that use the SPS resource; and activate or reactivate the SPS resource by using DCI or a MAC layer control message. For example, the DCI is used to activate or reactivate the SPS resource.

The DCI includes parameters such as a time-frequency position and a modulation and coding scheme (MCS) of the SPS resource.

Figure 3:
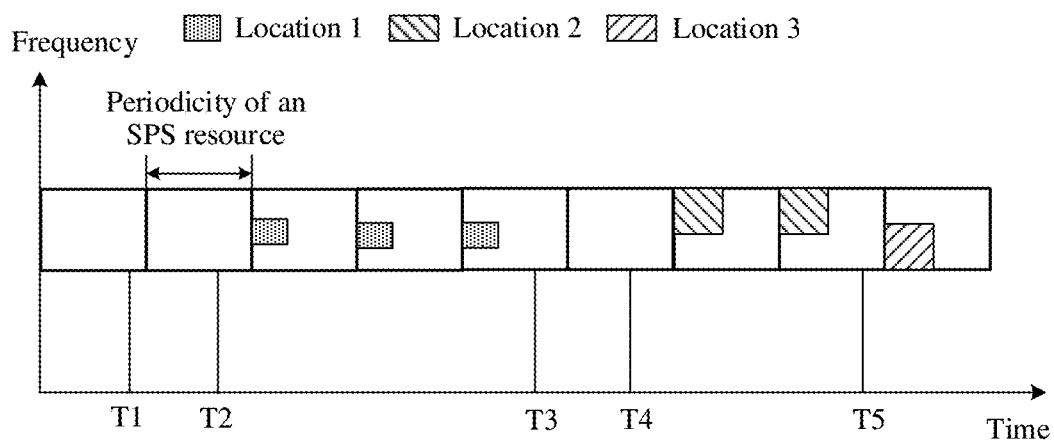
FIG. 3 is a schematic diagram of activating, deactivating, and reactivating an SPS resource by a network device by using DCI, in accordance with some embodiments, in accordance with some embodiments.

For example, FIG. 3 is a schematic diagram of activating, deactivating, and reactivating an SPS resource by a network device by using DCI. As shown in FIG. 3, the following is included:

At moment T1, the network device configures an SPS resource by using an RRC message.

At moment T2, the network device sends DCI-a to a terminal device, where DCI-a indicates to activate the SPS resource, and DCI-a indicates that a time-frequency position of the SPS resource is location 1.

At moment T3, the network device sends DCI-b to the terminal device, where DCI-b indicates to deactivate the SPS resource.

At moment T4, the network device sends DCI-c to the terminal device, where DCI-c indicates to activate the SPS resource, and DCI-c indicates that a time-frequency position of the SPS resource is location 2.

At moment T5, the network device sends DCI-d to the terminal device, where DCI-d indicates to reactivate the SPS resource, and DCI-d indicates that a time-frequency position of the SPS resource is location 3.

Based on the foregoing descriptions related to the downlink data transmission between the network device and the terminal device, the following further studies HARQ feedback of the terminal device.

The 5G communication system supports a plurality of types of possible services, for example, an ultra-reliable and low-latency communication (URLLC) service. The URLLC service is applied to scenarios such as a smart grid and an intelligent transportation system. The URLLC service usually has a periodicity, and has very high constraints on a delay and reliability. Therefore, an SPS resource is used for downlink transmission of the service.

Figure 4A:
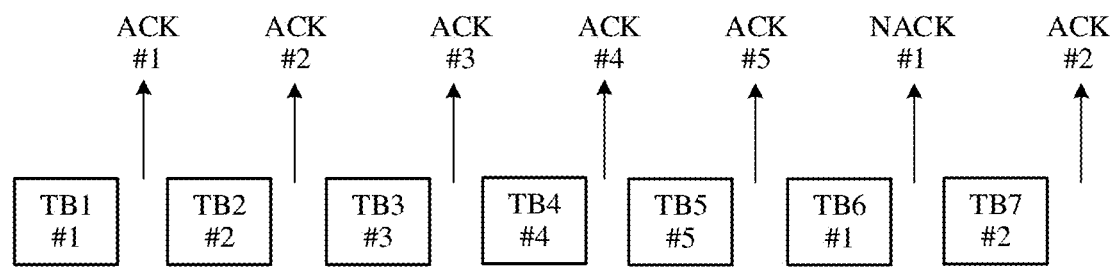
FIG. 4a is a schematic diagram of transmitting a data packet by using an SPS resource, in accordance with some embodiments, in accordance with some embodiments.

FIG. 4a is a schematic diagram of transmitting a data packet (namely, a TB) by using an SPS resource. As shown in FIG. 4a, a quantity of HARQ processes is 5, namely, HARQ process 1 to HARQ process 5 (where #1 in FIG. 4a represents that a HARQ process ID corresponding to an SPS resource is HARQ process 1). Transmission reliability of a URLLC service is high. Therefore, in a possible case, seven TBs are consecutively transmitted on the SPS resource and one TB fails to be decoded, and a terminal device needs to feed back a NACK. The terminal device needs to feed back ACKs for the other six TBs that are successfully decoded.

Considering that the reliability of the URLLC service reaches 99.999%, when radio link quality is good, a NACK needs to be fed back for one of approximately 100,000 data packets that fails to be transmitted, and ACKs need to be fed back for more than 99,000 remaining data packets. Consequently, ACK feedback overheads are large. Therefore, in a possible solution, the terminal device is configured to use a HARQ feedback manner with NACK feedback (in other words, skip ACK feedback), so that ACK feedback overheads can be reduced by a large quantity, and power consumption of the terminal device is reduced.

Table 1 shows feedback behaviors that the terminal device has when the HARQ feedback manner with only NACK feedback is used.

TABLE 1

| HARQ feedback manner with only NACK feedback | | |
|---|---|---|
| DL decoding result | HARQ feedback of the terminal device | Behavior of the network device |
| TB decoding fails | NACK | Schedule retransmission |
| TB decoding succeeds | — | No further behavior |
| No TB is received | NACK | No further behavior |

It can be learned from Table 1 that the terminal device no longer feeds back an ACK when TB decoding succeeds, and feeds back a NACK when TB decoding fails or a TB is not received. Accordingly, if the network device receives the NACK feedback, the network device determines that the corresponding TB fails to be transmitted, and schedules retransmission of the TB; or if the network device does not receive any feedback, the network device determines that the corresponding TB is successfully transmitted.

However, the solution in which the terminal device uses, for an SPS resource by default, the HARQ feedback manner with only NACK feedback has a limitation. For example, this solution is mainly applicable to a scenario in which a service periodicity matches an SPS periodicity. URLLC service scenarios are diversified. Therefore, there are some other scenarios, for example, Scenario 1 to Scenario 3 described below.

Scenario 1

In some scenarios such as a smart grid, a data packet for differential protection not has high constraints on a delay and reliability, but further calls for a delay variation to be within a low range. Therefore, in some scenarios, a service periodicity is a non-integer multiple of an SPS periodicity. For example, the service periodicity is 0.833 ms. As a result, an integer multiple of one slot is unable to be used to configure a matching SPS periodicity. In this case, a plurality of sets of SPS resources are configured, to meet a delay variation constraint as much as possible. For example, a periodicity of one set of SPS resources is 0.8 ms, and a periodicity of another SPS resource is 0.9 ms. However, in this manner, no TB is transmitted on some configured downlink assignments.

Figure 4B:
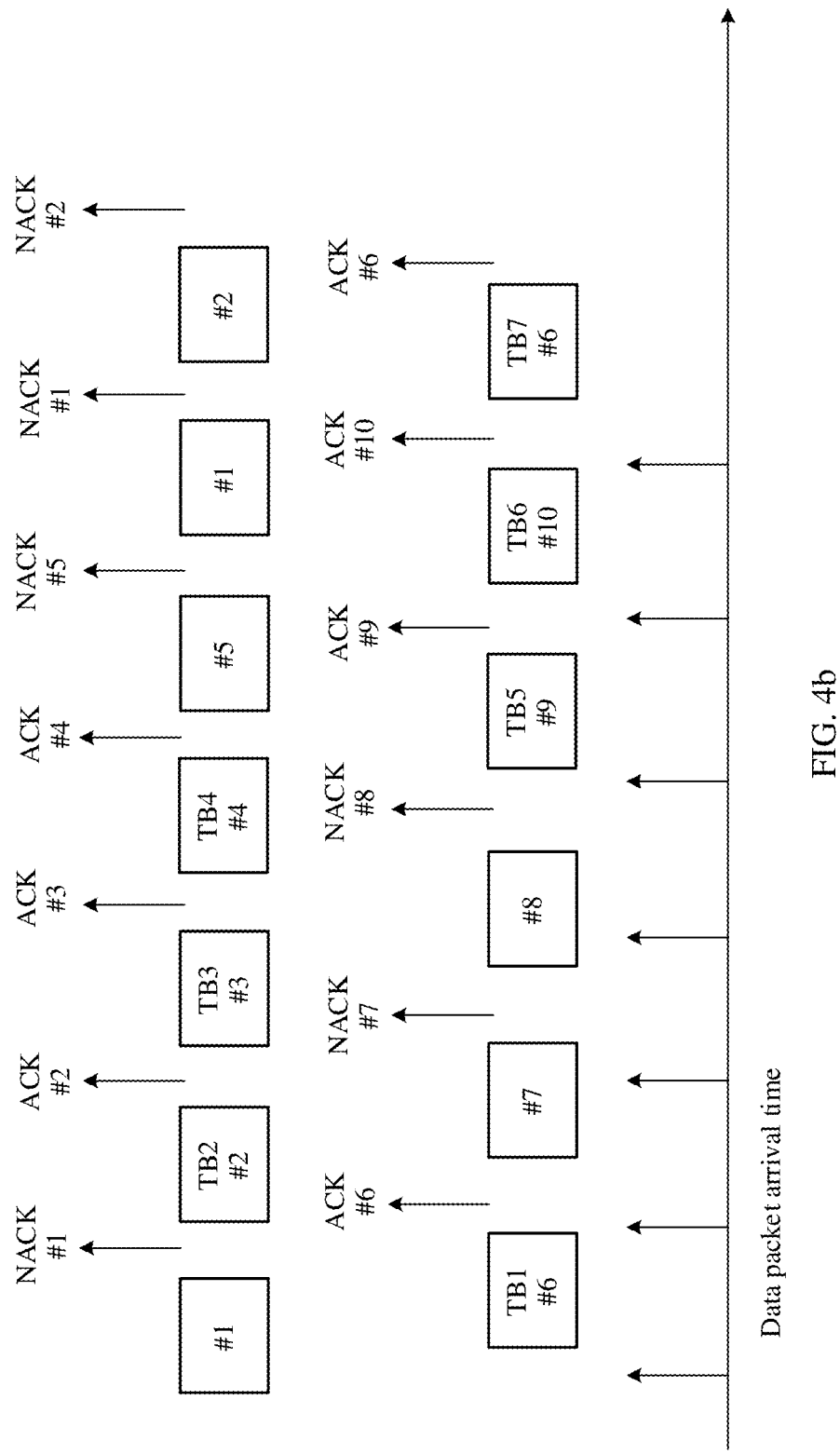
FIG. 4b is a schematic diagram of data packet transmission in Scenario 1, in accordance with some embodiments, in accordance with some embodiments.

As shown in FIG. 4b, data packets arrive at an interval of 0.833 ms, and two sets of SPS resources with different periodicities are configured. A periodicity of a first set of SPS resources is 0.8 ms, and HARQ processes are HARQ process 1 to HARQ process 5. A periodicity of a second set of SPS resources is 0.9 ms, and HARQ processes are HARQ process 6 to HARQ process 10. In a time period, TBs are transmitted in HARQ process 6, HARQ process 2, HARQ process 3, HARQ process 4, HARQ process 9, HARQ process 10, and HARQ process 6 that correspond to the SPS, so that the terminal device feeds back ACKs; and no TB is transmitted on another resource, so that the terminal device feeds back NACKs. In the time period, the TBs are transmitted on seven of thirteen configured downlink assignments in total. When more sets of SPS resources are configured, there is more configured downlink assignments on which no TB is transmitted. As a result, there is a large quantity of NACK feedbacks.

Scenario 2

Figure 4C:
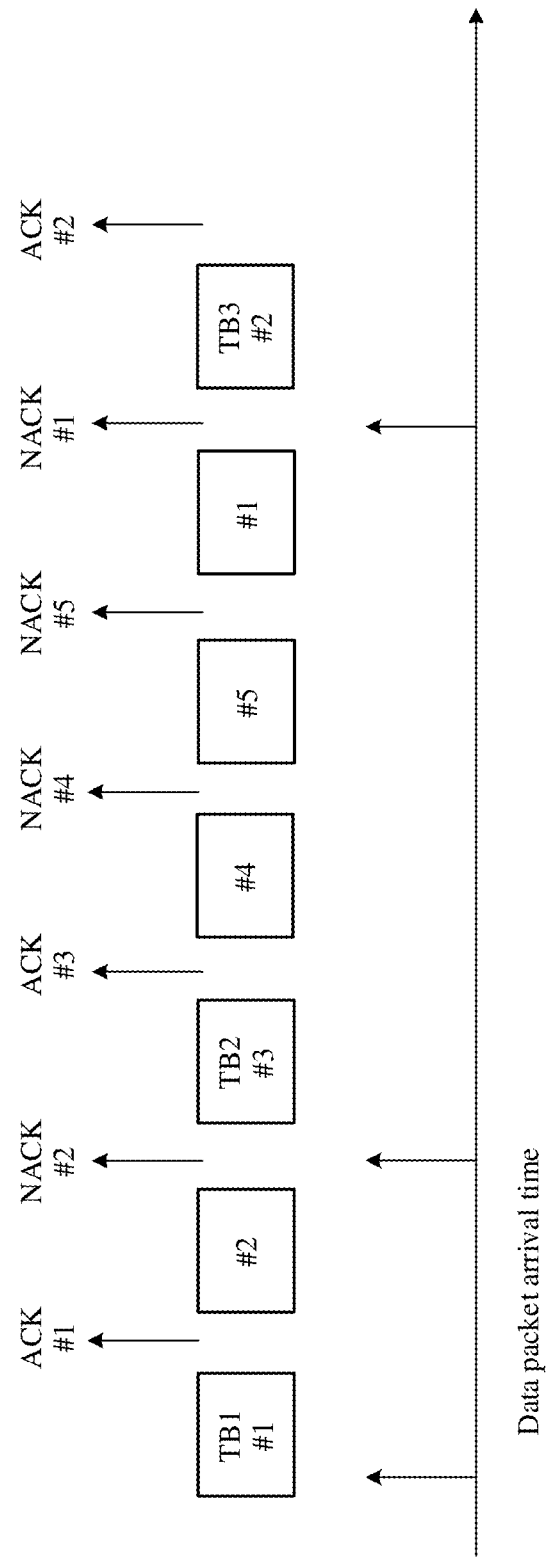
FIG. 4c is a schematic diagram of data packet transmission in Scenario 2, in accordance with some embodiments, in accordance with some embodiments.

As shown in FIG. 4c, for a service with an indefinite periodicity, that is, a service in which there is no fixed periodicity for arrival of a data packet, to meet a strict delay constraint of the service, a network device configures a short SPS periodicity, so that when a downlink data packet arrives, the data packet can be transmitted in a timely manner, to reduce a transmission delay. However, in this manner, no TB is transmitted on a large quantity of configured downlink assignments. For example, HARQ feedbacks corresponding to HARQ process 2, HARQ process 3, HARQ process 5, and HARQ process 1 are NACKs.

Scenario 3

In some remote control applications in an industrial scenario with a strict delay, a data packet arrives at an interval of less than 0.5 ms. Consequently, HARQ retransmission is unable to meet a delay constraint of the service. Therefore, any HARQ feedback of the terminal device is no longer helpful to reliability of the service.

Based on this, some embodiments provide a communication method, to implement flexible HARQ feedback, and to adapt to service constraint in different scenarios, reduce HARQ feedback overheads, and reduce power consumption of the terminal device.

In the following descriptions, the communication method provided in some embodiments is applicable to the network architecture shown in FIG. 1a. The method is performed by a first communication apparatus and a second communication apparatus. The first communication apparatus is the network device in FIG. 1a or a communication apparatus that can support the network device in implementing a function in the method, or certainly is another communication apparatus, for example, a chip or a chip system. The second communication apparatus is the terminal device in FIG. 1a or a communication apparatus that can support the terminal device in implementing a function in the method, or certainly is another communication apparatus, for example, a chip or a chip system. For ease of description, in the following, an example in which the method is performed by the network device and the terminal device is used. In other words, an example in which the first communication apparatus is the network device and the second communication apparatus is the terminal device is used.

Embodiment 1

Figure 5:
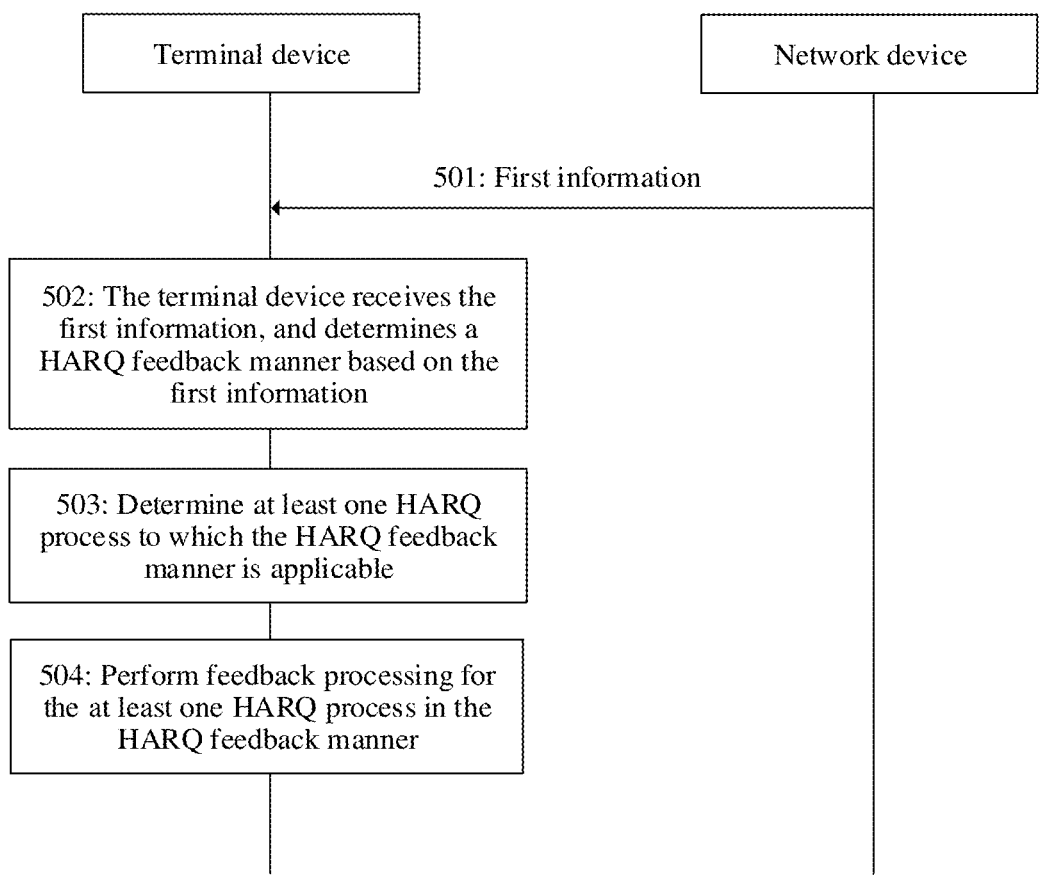
FIG. 5 is a schematic flowchart corresponding to a communication method according to Embodiment 1.

FIG. 5 is a schematic flowchart corresponding to a communication method, in accordance with some embodiments. As shown in FIG. 5, the method includes the following steps.

Step 501: A network device sends first information to a terminal device.

For example, the network device determines, based on a service constraint of the terminal device, a HARQ feedback manner and a HARQ process to which the HARQ feedback manner is applicable, to send the first information to the terminal device. The service constraint includes one or more of a service periodicity, a delay variation constraint, a delay constraint, and a network slice.

For example, in the foregoing Scenario 1, the network device determines that the HARQ feedback manner includes skipping NACK feedback, and that the HARQ processes to which the HARQ feedback manner is applicable includes a HARQ process corresponding to the first set of SPS resources and a HARQ process corresponding to the second set of SPS resources.

For another example, in the foregoing Scenario 2, the network device determines that the HARQ feedback manner includes skipping NACK feedback, and that the HARQ process to which the HARQ feedback manner is applicable includes a HARQ process corresponding to the service with the indefinite periodicity.

For another example, in the foregoing Scenario 3, the network device determines that the HARQ feedback manner includes skipping ACK feedback and NACK feedback, and that the HARQ process to which the HARQ feedback manner is applicable includes a HARQ process corresponding to the service with the strict delay.

Step 502: The terminal device receives the first information, and determines the HARQ feedback manner based on the first information, where the HARQ feedback manner includes skipping ACK feedback and/or NACK feedback.

For example, the terminal device determines the HARQ feedback manner based on the first information in a plurality of manners.

In a possible implementation, the first information includes indication information, and the indication information indicates the HARQ feedback manner. Accordingly, the terminal device determines the HARQ feedback manner based on the indication information. The indication information is carried in a plurality of types of possible messages, for example, an RRC message, a PDCP layer control message, an RLC layer control message, a MAC layer control message, and a physical layer control message. Alternatively, the indication information is carried in a data packet. The RRC message is an RRC reconfiguration message, an RRC resume (RRC resume) message, or an RRC setup (RRC setup) message. This is not limited. The PDCP layer control message is a PDCP layer control PDU. The RLC layer control message is an RLC layer control PDU. The MAC layer control message is a MAC CE. The physical layer control message is DCI.

The following is noted. (1) A location of the indication information in the message is not limited. For example, when the indication information is carried in the MAC CE, the indication information is carried in a header or data payload of the MAC CE. For another example, when the indication information is carried in the data packet, the indication information is carried in a header of a PDCP layer data PDU or an RLC layer data PDU.

(2) A manner in which the indication information indicates the HARQ feedback manner is not limited For example, the indication information includes an index value of the HARQ feedback manner. If the index value is 1, the HARQ feedback manner is skipping ACK feedback. If the index value is 2, the HARQ feedback manner is skipping NACK feedback. If the index value is 3, the HARQ feedback manner is skipping ACK feedback and NACK feedback. For another example, when the indication information is carried in the header of the MAC CE, the header of the MAC CE includes a logical channel identifier (LCID) field, and the indication information occupies the LCID field, in other words, different HARQ feedback manners is indicated by using the LCID field. For example, if LCID=X, the HARQ feedback manner is skipping ACK feedback. If LCID=Y, the HARQ feedback manner is skipping NACK feedback. If LCID=Z, the HARQ feedback manner is skipping ACK feedback and NACK feedback.

In still another possible implementation, the first information includes a message, where the message is an RRC message or DCI. Accordingly, the terminal device determines the HARQ feedback manner depending on whether the message includes configuration information of a physical uplink control channel (PUCCH) resource, or based on a format of the message, a scrambling manner of the message (for example, a radio network temporary identifier (RNTI) for scrambling the message), or the like. The PUCCH resource is for carrying feedback information for a HARQ process, for example, an ACK or a NACK.

In still another possible implementation, the first information includes preset priority information. Accordingly, the terminal device determines the HARQ feedback manner based on a priority of a logical channel corresponding to a service and the preset priority information.

Step 503: The terminal device determines at least one HARQ process to which the HARQ feedback manner is applicable.

Herein, the at least one HARQ process includes a HARQ process corresponding to an SPS resource and/or a HARQ process corresponding to a dynamic scheduling resource. Alternatively, the at least one HARQ process includes one or more HARQ processes corresponding to one or more types of services.

For example, the terminal device determines, in a plurality of manners, the at least one HARQ process to which the HARQ feedback manner is applicable. Two possible implementations are described herein: Implementation a1 and Implementation a2.

In Implementation a1, the network device sends second information to the terminal device, where the second information indicates the at least one HARQ process to which the HARQ feedback manner is applicable. For example, the second information includes a HARQ process number of the at least one HARQ process to which the HARQ feedback manner is applicable. In this way, the terminal device determines, based on the second information, the HARQ process to which the HARQ feedback manner is applicable. The second information is carried in a plurality of types of possible messages, for example, an RRC message, where the RRC message is an RRC reconfiguration message, an RRC resume message, and an RRC setup message. This is not limited.

In Implementation a2, the HARQ process to which the HARQ feedback manner is applicable is predetermined in a protocol. For example, the HARQ process to which the HARQ feedback manner is applicable includes HARQ processes corresponding to the SPS resource and/or HARQ processes corresponding to the dynamic scheduling resource; or includes HARQ processes corresponding to the one or more types of services. In this case, the network device is unneeded to send the second information to the terminal device, to effectively save transmission resources.

In some embodiments, Implementation a1 and Implementation a2 is separately implemented, or is implemented in combination. For example, in a case of combined implementation, if the network device sends the second information to the terminal device, the terminal device determines, based on the second information, the HARQ process to which the HARQ feedback manner is applicable (namely, Implementation a1); or if the network device does not send the second information to the terminal device, the terminal device determines, based on the protocol, the HARQ process to which the HARQ feedback manner is applicable (namely, Implementation a2).

Step 504: The terminal device performs feedback processing for the at least one HARQ process in the HARQ feedback manner.

For example, the at least one HARQ process includes a first HARQ process. The following uses the first HARQ process as an example to describe some possible implementations in which the terminal device performs feedback processing for the first HARQ process in the HARQ feedback manner.

In Example 1, the HARQ feedback manner includes skipping ACK feedback. If the terminal device receives a data packet from the first HARQ process and the data packet is successfully decoded, the terminal device skips feeding back, for the data packet, an ACK to the first HARQ process. Optionally, if the terminal device receives a data packet from the first HARQ process and the data packet fails to be decoded, the terminal device feeds back, for the data packet, a NACK to the first HARQ process; or if the terminal device does not receive a data packet from the first HARQ process, the terminal device feeds back a NACK to the first HARQ process. The HARQ feedback manner alternatively is described as performing NACK only (NACK only) feedback.

In Example 2, the HARQ feedback manner includes skipping NACK feedback. If the terminal device receives a data packet from the first HARQ process and the data packet fails to be decoded, the terminal device skips feeding back, for the data packet, a NACK to the first HARQ process; or if the terminal device does not receive a data packet from the first HARQ process, the terminal device skips feeding back a NACK to the first HARQ process. Optionally, if the terminal device receives a data packet from the first HARQ process and the data packet is successfully decoded, the terminal device feeds back, for the data packet, an ACK to the first HARQ process. The HARQ feedback manner alternatively is described as performing ACK only (ACK only) feedback.

In Example 3, the HARQ feedback manner includes skipping ACK feedback and NACK feedback, and the terminal device skips feeding back an ACK and a NACK to the first HARQ process. That the terminal device skips feeding back an ACK and a NACK to the first HARQ process includes: If the terminal device receives a data packet from the first HARQ process and the data packet is successfully decoded, the terminal device skips feeding back, for the data packet, the ACK to the first HARQ process; or if the terminal device receives a data packet from the first HARQ process and the data packet fails to be decoded, the terminal device skips feeding back, for the data packet, the NACK to the first HARQ process; or if the terminal device does not receive a data packet from the first HARQ process, the terminal device skips feeding back the NACK to the first HARQ process.

In a possible solution, there is two HARQ feedback mechanisms: a TB transmission-based HARQ feedback mechanism and a code block group (CBG) transmission-based HARQ feedback mechanism. One TB includes a plurality of CBs, and one CBG in the TB includes at least one CB in the TB. That is, the CBG is a group of the plurality of CBs in the TB. In the TB transmission-based HARQ feedback mechanism, if the TB is successfully decoded, an ACK is fed back; or if the TB fails to be decoded or the TB is not received, a NACK is fed back. In the CBG transmission-based HARQ feedback mechanism, HARQ information (for example, an ACK or a NACK) of one TB includes a plurality of bits, each bit corresponds to one CBG in the TB, and a value of the bit is for indicating whether the CBG corresponding to the bit is successfully decoded. If a CBG in the TB is successfully decoded, an ACK is fed back for the CBG. If another CBG fails to be decoded, a NACK is fed back for the another CBG.

The HARQ feedback manner in some embodiments is a HARQ feedback manner in the TB transmission-based HARQ feedback mechanism, or is a HARQ feedback manner in the CBG transmission-based HARQ feedback mechanism. Descriptions are separately provided in the following.

(1) The HARQ feedback manner in some embodiments is the HARQ feedback manner in the TB transmission-based HARQ feedback mechanism. In this case, that the data packet is successfully decoded or fails to be decoded described in the foregoing Example 1 to Example 3 means that a TB is successfully decoded or fails to be decoded.

① The HARQ feedback manner includes skipping ACK (skip ACK) feedback. This means that if the TB is successfully decoded, no ACK is fed back; or if the TB fails to be decoded, a NACK is fed back.

② The HARQ feedback manner includes skipping NACK (skip NACK) feedback. This means that if the TB fails to be decoded, no NACK is fed back; or if the TB is successfully decoded, an ACK is fed back.

③ The HARQ feedback manner includes skipping ACK feedback and NACK feedback. This means that neither a NACK nor an ACK is fed back regardless of whether the TB is successfully decoded or fails to be decoded. That is, HARQ feedback is not performed.

(2) The HARQ feedback manner in some embodiments is the HARQ feedback manner in the CBG transmission-based HARQ feedback mechanism. In this case, that the data packet is successfully decoded described in the foregoing Example 1 to Example 3 includes: At least one CBG in the data packet (namely, a TB) is successfully decoded. Feeding back an ACK or skipping feeding back an ACK for the data packet is understood as feeding back an ACK or skipping feeding back an ACK for a successfully decoded CBG in the TB. Alternatively, that the data packet fails to be decoded described in the foregoing Example 1 to Example 3 includes: At least one CBG in the data packet (namely, a TB) fails to be decoded. Feeding back a NACK or skipping feeding back a NACK for the data packet is understood as feeding back a NACK or skipping feeding back a NACK for a CBG that fails to be decoded in the TB.

① The HARQ feedback manner includes skipping ACK (skip ACK) feedback. This means that if at least one CBG in the TB is successfully decoded or CBGs in the TB are successfully decoded, an ACK is fed back for no CBG in the at least one CBG or the CBGs in the TB; or if at least one CBG in the TB fails to be decoded or CBGs in the TB fail to be decoded, a NACK or NACKs are fed back for the at least one CBG or the CBGs in the TB.

② The HARQ feedback manner includes skipping NACK (skip NACK) feedback. This means that if at least one CBG in the TB fails to be decoded or CBGs in the TB fail to be decoded, a NACK is fed back for no CBG in the at least one CBG or the CBGs in the TB; or if at least one CBG in the TB is successfully decoded or CBGs in the TB are successfully decoded, an ACK or ACKs are fed back for the at least one CBG or the CBGs in the TB.

③ The HARQ feedback manner includes skipping ACK feedback and NACK feedback. This means that regardless of whether at least one CBG in the TB is successfully decoded or fails to be decoded, or regardless of whether CBGs in the TB are successfully decoded or fail to be decoded, an ACK is fed back for no CBG in the at least one CBG or the CBGs in the TB, and a NACK is fed back for no CBG in the at least one CBG or the CBGs in the TB. That is, HARQ feedback is not performed.

In some embodiments, when the network device carries the indication information in the data packet, there is a plurality of possible implementations. Two implementations are described herein in detail: Implementation b1 and Implementation b2.

(1) Implementation b1

The network device includes indication information in a data packet or include indication information in each of some data packets. For example, the indication information indicates HARQ feedback manner a, and the network device indicates, by using second information, a HARQ process to which HARQ feedback manner a is applicable. In this way, the terminal device performs feedback processing for the corresponding HARQ process based on HARQ feedback manner a.

In some embodiments, the HARQ process to which HARQ feedback manner a is applicable includes a HARQ process for transmitting one or more of the foregoing data packets, and further includes another HARQ process.

(2) Implementation b2

The network device includes indication information in each of a plurality of data packets. For example, the plurality of data packets includes data packet 1, data packet 2, and data packet 3. Indication information 1 is carried in data packet 1, and indication information 1 indicates HARQ feedback manner 1. Indication information 2 is carried in data packet 2, and indication information 2 indicates HARQ feedback manner 2. Indication information 3 is carried in data packet 3, and indication information 3 indicates HARQ feedback manner 3. Data packet 1, data packet 2, and data packet 3 is data packets transmitted by using a same HARQ process, or is data packets transmitted by using different HARQ processes. For example, data packet 1 and data packet 2 are data packets transmitted by using HARQ process 1, and data packet 3 is a data packet transmitted by using HARQ process 2. After receiving data packet 1, the terminal device performs feedback processing for HARQ process 1 based on a decoding result of data packet 1 and HARQ feedback manner 1. After receiving data packet 2, the terminal device performs feedback processing for HARQ process 1 based on a decoding result of data packet 2 and HARQ feedback manner 2. After receiving data packet 3, the terminal device performs feedback processing for HARQ process 2 based on a decoding result of data packet 3 and HARQ feedback manner 3. HARQ feedback manner 1, HARQ feedback manner 2, and HARQ feedback manner 3 is the same, or is different.

For example, in a case in which the terminal device does not receive a data packet from HARQ process 1 or HARQ process 2, NACK is fed back, or no NACK is fed back in this case is predetermined.

For example, in Implementation b2, the network device is unable to indicate a HARQ process to which a HARQ feedback manner is applicable.

In some embodiments, the network device sends the first information to the terminal device, so that the terminal device can determine the HARQ feedback manner based on the first information, where the HARQ feedback manner includes skipping ACK feedback and/or NACK feedback. In this manner, the network device determines a corresponding HARQ feedback manner based on service constraints in different scenarios, to indicate the HARQ feedback manner to the terminal device. In other words, the network device controls the HARQ feedback manner used by the terminal device, so that the terminal device can be flexibly controlled to use different HARQ feedback manners in different scenarios, to adapt to a service constraint, effectively reduce power consumption of the terminal device, and save air interface resources.

Based on Embodiment 1, the following describes some implementations with reference to Embodiment 2 to Embodiment 4.

Embodiment 2

Figure 6:
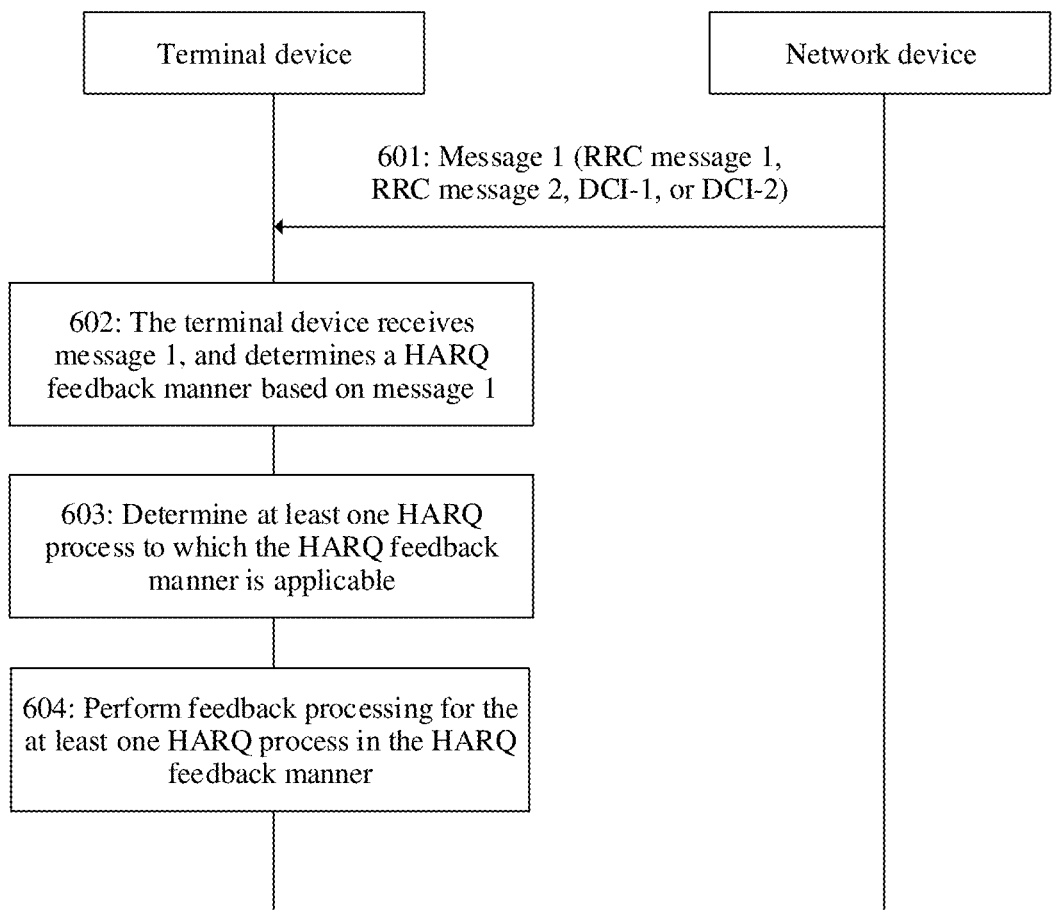
FIG. 6 is a schematic flowchart corresponding to a communication method according to Embodiment 2.

FIG. 6 is a schematic flowchart corresponding to a communication method according to Embodiment 2 of this application. As shown in FIG. 6, the method includes the following steps.

Step 601: A network device sends message 1 to a terminal device.

Step 602: The terminal device receives message 1 and determines a HARQ feedback manner based on message 1.

For example, message 1 is a message associated with an SPS resource (which is referred to as SPS resource 1 for ease of description).

In an example, message 1 is RRC message 1, where RRC message 1 is for configuring SPS resource 1. For example, RRC message 1 includes configuration information of SPS resource 1 and configuration information of a PDSCH transmitted on SPS resource 1. RRC message 1 includes indication information, and the indication information indicates the HARQ feedback manner. For example, the indication information is included in the configuration information of SPS resource 1, or is included in the configuration information of the PDSCH transmitted on SPS resource 1. In this case, the terminal device determines the HARQ feedback manner based on the indication information included in RRC message 1.

For example, a dedicated configuration of a downlink bandwidth part (BWP) carried in RRC message 1 is used as an example. In a BWP-DownlinkDedicated information element (IE), the indication information is included in a pdsch-Config information element (namely, the configuration information of the PDSCH), or is included in an sps-Config information element (namely, the configuration information of SPS resource 1).

```
BWP-DownlinkDedicated (BWP-DownlinkDedicated) ::=
SEQUENCE
(sequence) {
    pdcch-Config (PDCCH configuration information)   SetupRelease {
    PDCCH-
Config }
    pdsch-Config  (PDSCH configuration information)  SetupRelease {
    PDSCH-
Config }
    sps-Config   (SPS configuration information)  SetupRelease {
    SPS-Config }
    ...
}
```

In still another example, message 1 is RRC message 2, where RRC message 2 is for configuring a PUCCH resource, and the PUCCH resource is for carrying feedback information for a HARQ process corresponding to SPS resource 1. In this case, the terminal device determines the HARQ feedback manner depending on whether RRC message 2 carries configuration information of the PUCCH resource. In other words, RRC message 2 indicates the HARQ feedback manner depending on whether RRC message 2 carries the configuration information of the PUCCH resource. For example, when RRC message 2 does not carry the configuration information of the PUCCH resource, the HARQ feedback manner includes skipping ACK feedback and/or NACK feedback; or when RRC message 2 carries the configuration information of the PUCCH resource, HARQ feedback is normally performed (that is, an ACK and a NACK is not skipped).

In still another example, message 1 is DCI-1, DCI-1 is for activating or reactivating SPS resource 1, DCI-1 includes indication information, and the indication information indicates the HARQ feedback manner. In this case, the terminal device determines the HARQ feedback manner based on the indication information included in DCI-1.

In still another example, message 1 is DCI-2, and DCI-2 is for activating or reactivating SPS resource 1. In this case, the terminal device determines the HARQ feedback manner based on a DCI format (DCI format) or a scrambling manner of DCI-2. In other words, DCI-2 indicates the HARQ feedback manner based on a used format or scrambling manner.

For example, when the format of DCI-2 is DCI format (format) 1, the HARQ feedback manner includes skipping ACK feedback; or when the format of DCI-2 is DCI format (format) 2, the HARQ feedback manner includes skipping NACK; or when the format of DCI-2 is DCI format (format) 3, the HARQ feedback manner includes skipping ACK feedback and NACK feedback. DCI format 1, DCI format 2, and DCI format 3 is formats predetermined in a protocol.

For another example, when the scrambling manner of DCI-2 is scrambling by using RNTI #1, the HARQ feedback manner includes skipping ACK feedback; or when the scrambling manner of DCI-2 is scrambling by using RNTI #2, the HARQ feedback manner includes skipping NACK feedback; or when the scrambling manner of DCI-2 is scrambling by using RNTI #3, the HARQ feedback manner includes skipping ACK feedback and NACK feedback. RNTI #1, RNTI #2, and RNTI #3 is RNTIs predetermined in a protocol.

In still another example, message 1 is a MAC layer control message (or MAC signaling), the MAC signaling is for activating or reactivating SPS resource 1, the MAC signaling includes indication information, and the indication information indicates the HARQ feedback manner. In this case, the terminal device determines the HARQ feedback manner based on the indication information included in the MAC signaling.

Step 603: The terminal device determines at least one HARQ process to which the HARQ feedback manner is applicable.

Step 604: The terminal device performs feedback processing for the at least one HARQ process in the HARQ feedback manner.

Herein, the terminal device determines, in a plurality of manners, the at least one HARQ process to which the HARQ feedback manner is applicable.

In a possible implementation, the at least one HARQ process to which the HARQ feedback manner is applicable is predetermined in a protocol. For example, when the network device indicates the HARQ feedback manner by using the message (for example, RRC message 1, RRC message 2, DCI-1, DCI-2, or the MAC signaling) associated with SPS resource 1, the HARQ processes to which the HARQ feedback manner is applicable include HARQ processes corresponding to SPS resource 1.

In another possible implementation, the network device sends second information to the terminal device, where the second information indicates the at least one HARQ process to which the HARQ feedback manner is applicable. For example, the second information indicates that the HARQ processes to which the HARQ feedback manner is applicable are all or a part of HARQ processes corresponding to SPS resource 1. For another example, the network device configures a plurality of sets of SPS resources for the terminal device, and the at least one HARQ process indicated by the second information includes all or a part of HARQ processes corresponding to the plurality of sets of SPS resources configured by the network device for the terminal device. For example, in addition to SPS resource 1, SPS resource 2 and SPS resource 3 are further configured by the network device for the terminal device. HARQ processes corresponding to SPS resource 1 include HARQ process 1 to HARQ process 5. HARQ processes corresponding to SPS resource 2 include HARQ process 6 to HARQ process 10. HARQ processes corresponding to SPS resource 3 include HARQ process 11 to HARQ process 15. In this case, the at least one HARQ process includes all or a part of HARQ process 1 to HARQ process 15.

For example, the second information is carried in RRC message 1 or RRC message 2, or is carried in another possible message. This is not limited.

In this manner, the network device indicates, by using the message associated with SPS resource 1, the HARQ feedback manner applicable to the HARQ process corresponding to SPS resource 1, so that a corresponding HARQ feedback manner can be indicated for a service transmitted on a resource.

Embodiment 3

Figure 7:
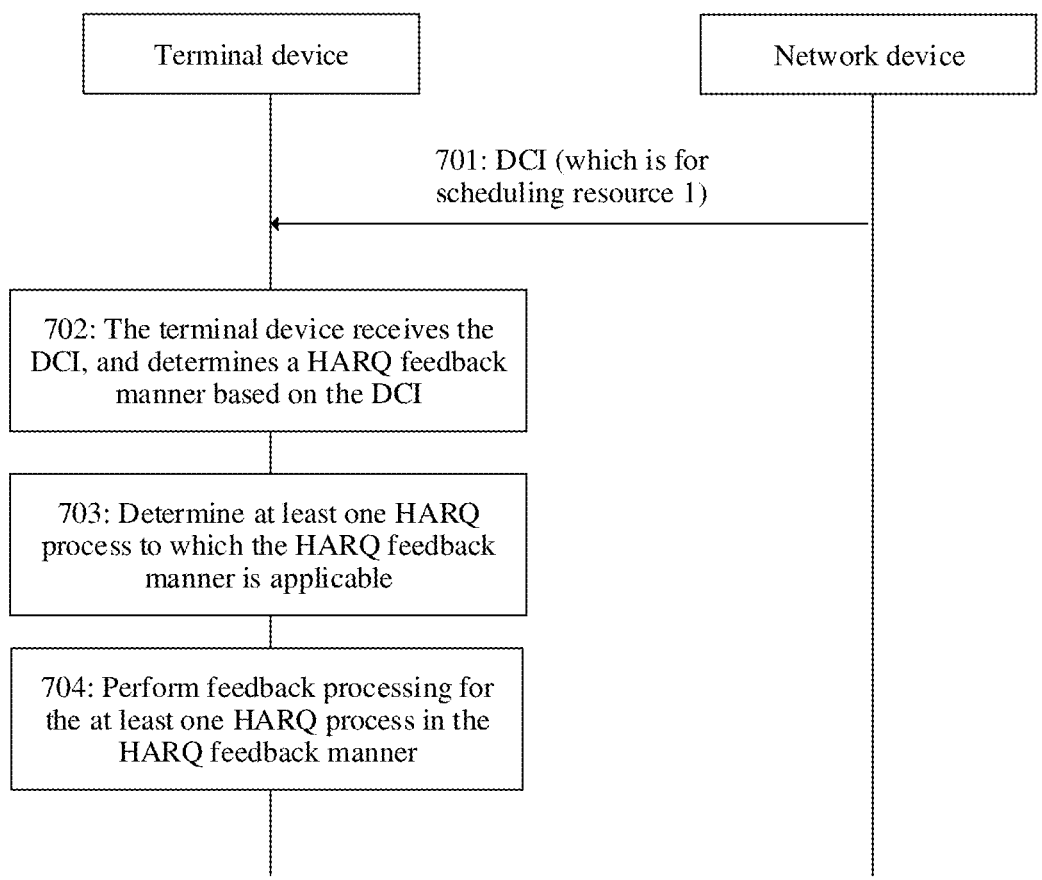
FIG. 7 is a schematic flowchart corresponding to a communication method according to Embodiment 3.

FIG. 7 is a schematic flowchart corresponding to a communication method according to Embodiment 3 of this application. As shown in FIG. 7, the method includes the following steps.

Step 701: A network device sends DCI to a terminal device, where the DCI is for scheduling a dynamic scheduling resource (which is referred to as resource 1 for ease of description).

Step 702: The terminal device receives the DCI, and determines a HARQ feedback manner based on the DCI.

In an example, the DCI includes indication information, and the indication information indicates the HARQ feedback manner. In this case, the terminal device determines the HARQ feedback manner based on the indication information included in the DCI.

In still another example, the DCI indicates the HARQ feedback manner based on a used DCI format or scrambling manner. In this case, the terminal device determines the HARQ feedback manner based on the DCI format or the scrambling manner of the DCI.

Step 703: The terminal device determines at least one HARQ process to which the HARQ feedback manner is applicable.

Step 704: The terminal device performs feedback processing for the at least one HARQ process in the HARQ feedback manner.

Herein, the terminal device determines, in a plurality of manners, the at least one HARQ process to which the HARQ feedback manner is applicable.

In a possible implementation, the HARQ process to which the HARQ feedback manner is applicable is predetermined in a protocol. For example, when the network device indicates the HARQ feedback manner by using the DCI that is for scheduling resource 1, the HARQ processes to which the HARQ feedback manner is applicable include HARQ processes corresponding to resource 1.

In another possible implementation, the network device sends second information to the terminal device, where the second information indicates the at least one HARQ process to which the HARQ feedback manner is applicable. For example, the second information indicates that the HARQ processes to which the HARQ feedback manner is applicable are all or a part of HARQ processes corresponding to resource 1.

In this manner, the network device indicates, by using the DCI that is for scheduling resource 1, the HARQ feedback manner applicable to the HARQ process corresponding to resource 1, so that a corresponding HARQ feedback manner can be indicated for a service transmitted on a resource.

Embodiment 4

Figure 8:
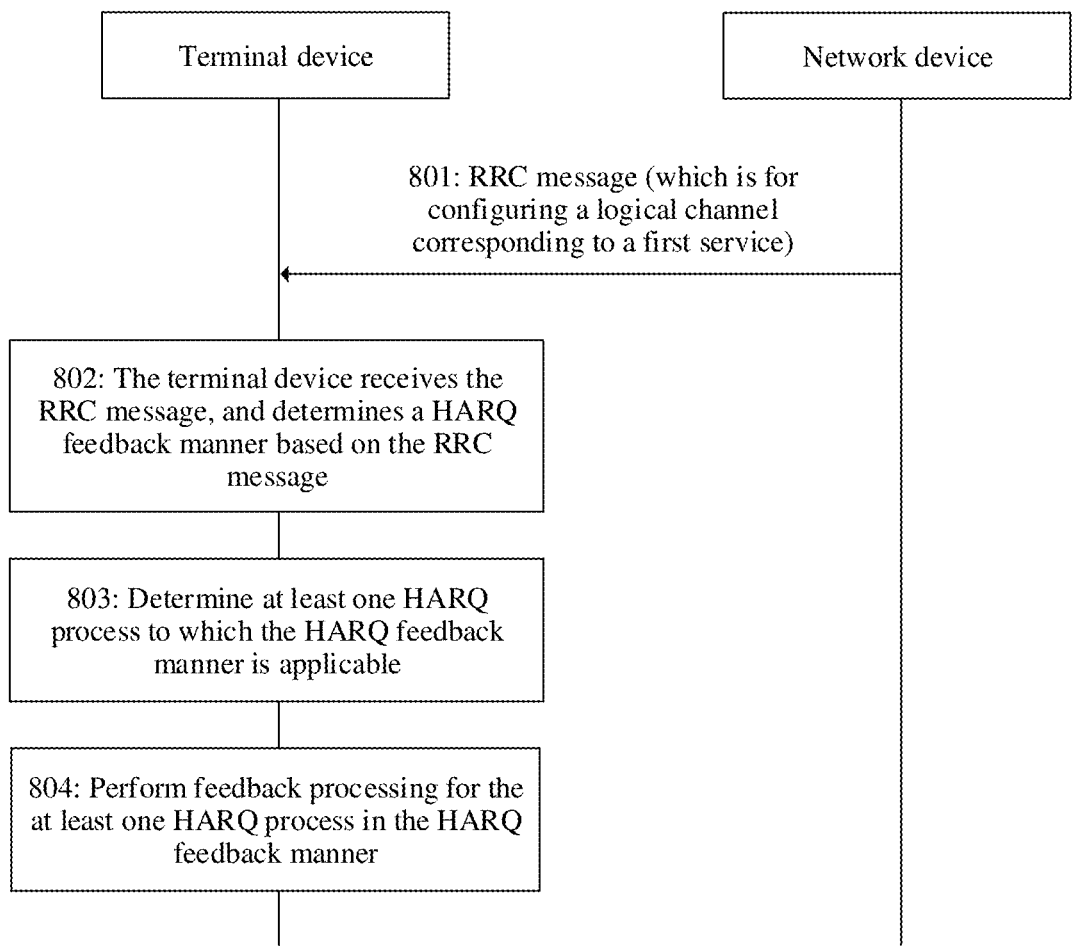
FIG. 8 is a schematic flowchart corresponding to a communication method according to Embodiment 4.

FIG. 8 is a schematic flowchart corresponding to a communication method according to Embodiment 4 of this application. As shown in FIG. 8, the method includes the following steps.

Step 801: A network device sends an RRC message to a terminal device.

Step 802: The terminal device receives the RRC message, and determines a HARQ feedback manner based on the RRC message.

For example, the RRC message is a message associated with a first service. For example, the RRC message is for configuring a logical channel corresponding to the first service.

In an example, the RRC message includes indication information, and the indication information indicates the HARQ feedback manner. In this case, the terminal device determines the HARQ feedback manner based on the indication information included in the RRC message. For example, the RRC message includes configuration information of the logical channel, and the indication information is carried in the configuration information of the logical channel.

In still another example, the RRC message includes preset priority information. In this case, the terminal device determines the HARQ feedback manner based on priority information of the logical channel corresponding to the first service and the preset priority information. For example, when a priority of the logical channel corresponding to the first service is higher than or equal to a preset priority, the HARQ feedback manner includes skipping ACK feedback and/or NACK feedback; or when a priority of the logical channel corresponding to the first service is lower than a preset priority, HARQ feedback is normally performed.

In another possible embodiment, the preset priority information alternatively is predetermined in a protocol. In this case, the terminal device no longer needs to obtain the preset priority information from the network device, so that resource overheads can be reduced.

Step 803: The terminal device determines at least one HARQ process to which the HARQ feedback manner is applicable.

Step 804: The terminal device performs feedback processing for the at least one HARQ process in the HARQ feedback manner.

Herein, the terminal device determines, in a plurality of manners, the at least one HARQ process to which the HARQ feedback manner is applicable.

In a possible implementation, the HARQ process to which the HARQ feedback manner is applicable is predetermined in a protocol. For example, when the network device indicates the HARQ feedback manner by using the message (for example, the foregoing RRC message) associated with the first service, the HARQ processes to which the HARQ feedback manner is applicable include HARQ processes corresponding to the first service.

In another possible implementation, the network device sends second information to the terminal device, where the second information indicates the at least one HARQ process to which the HARQ feedback manner is applicable. For example, the second information indicates that the HARQ processes to which the HARQ feedback manner is applicable are all or a part of HARQ processes corresponding to the first service.

According to the foregoing method, the network device indicates, by using the RRC message, a HARQ feedback manner for a HARQ process corresponding to a service, so that a corresponding HARQ feedback manner can be more accurately used for a service.

A non-continuous reception or discontinuous reception (DRX) mechanism is introduced in air interface communication between the terminal device and the network device, to reduce power consumption of the terminal device.

The following describes the DRX mechanism.

In the DRX mechanism, the terminal device is in DRX active mode or DRX dormant mode. When the terminal device is in DRX active mode, the terminal device powers on a receiver to monitor a PDCCH (for example, monitors PDCCHs scrambled by using various RNTIs). When the terminal device is in DRX dormant mode, the terminal device is unneeded to monitor the PDCCH, to reduce the power consumption of the terminal device. That the terminal device is in DRX active mode alternatively is described as: The terminal device is in active mode, or the terminal device is in awake mode, or the terminal device is awake. This is not limited. That the terminal device is in DRX dormant mode alternatively is described as: The terminal device is in dormant mode, or the terminal device is in sleep mode. This is not limited.

For example, after the DRX mechanism is introduced, the network device configures the following parameters for the terminal device.

(1) DRX cycle: A DRX cycle represents a cycle of discontinuous reception. In each cycle, the terminal device wakes up regularly for a period of time (the terminal device is in DRX active mode in the period of time) to monitor the PDCCH. There are two types of DRX cycles: a long cycle and a short cycle. The long cycle is an integer multiple of the short cycle.

(2) drx-onDurationTimer: drx-onDurationTimer represents continuous downlink duration, and indicates a period of time in which the terminal device keeps awake after waking up (that is, a period of time in which the terminal device is in DRX active mode). In this period of time, the terminal device needs to monitor the PDCCH. The timer starts at a starting moment of each DRX cycle.

(3) drx-InactivityTimer: drx-InactivityTimer represents continuous downlink duration, and the terminal device needs to monitor the PDCCH in the duration. The timer is started or restarted when the terminal device successfully demodulates a PDCCH that is for scheduling newly transmitted data (which is newly transmitted uplink or downlink data) of the terminal device.

(4) drx-HARQ-RTT-Timer: drx-HARQ-RTT-Timer represents a minimum retransmission scheduling interval, which is for indicating a minimum quantity of symbols after which a next HARQ retransmission occurs. The timer is classified into an uplink corresponding timer (namely, drx-HARQ-RTT-TimerUL) and a downlink corresponding timer (namely, drx-HARQ-RTT-TimerDL). drx-HARQ-RTT-TimerDL is started in the $1^{st}$ symbol after end of HARQ feedback for a HARQ process transmitted on a downlink. drx-HARQ-RTT-TimerUL is started in the $1^{st}$ symbol after end of uplink transmission of a HARQ process (if the uplink transmission is repetition (repetition) transmission, drx-HARQ-RTT-TimerUL is started in the $1^{st}$ symbol after end of the $1^{st}$ transmission).

(5) drx-RetransmissionTimer: drx-RetransmissionTimer represents a waiting period of time for receiving scheduling for retransmission, and the timer indicates a maximum period of time in which the terminal device in DRX active mode waits for retransmitted data. The timer is classified into an uplink corresponding timer (namely, drx-RetransmissionTimerUL) and a downlink corresponding timer (namely, drx-RetransmissionTimerDL). drx-RetransmissionTimerDL is started in the $1^{st}$ symbol after drx-HARQ-RTT-TimerDL of a HARQ process expires, and drx-RetransmissionTimerUL is started in the $1^{st}$ symbol after drx-HARQ-RTT-TimerUL of a HARQ process expires.

(6) drx-shortCycleTimer: drx-shortCycleTimer represents lifetime of the short cycle. After the timer expires, the long cycle needs to be used. When the short cycle is configured, the timer is started or restarted in the following two cases: (1) drx-Inactivity Timer expires; and (2) the terminal device receives a DRX command MAC CE. The DRX command MAC CE is a MAC CE that enables the terminal device to immediately enter dormant mode. After receiving the control signaling, the terminal device immediately stops drx-onDurationTimer and drx-InactivityTimer.

In addition to the parameters described above, other possible parameters, for example, drx-SlotOffset and drx-StartOffset, is further configured by the network device for the terminal device. drx-StartOffset is for determining a subframe from which a DRX cycle starts, and drx-SlotOffset is for delaying starting of drx-onDurationTimer by a period of time from a front boundary of the subframe in which a start location of the DRX cycle is located.

The terminal device maintains the DRX cycle and various timers described above according to the following rules. The DRX cycle, drx-onDurationTimer, drx-InactivityTimer, and drx-shortCycleTimer are maintained per MAC entity (per MAC entity), that is, one MAC entity of the terminal device maintains one set of DRX cycles, drx-onDurationTimer, drx-InactivityTimer, drx-shortCycleTimer, and the like. drx-HARQ-RTT-Timer and drx-RetransmissionTimer are maintained per HARQ process, that is, each HARQ process starts/restarts, based on a condition, drx-HARQ-RTT-Timer and drx-RetransmissionTimer that are related to the HARQ process.

After the DRX cycle is configured, a period of time in which the terminal device is in active mode (namely, a period of time in which the terminal device is awake) includes: (1) a period of time in which drx-onDurationTimer/drx-InactivityTimer/drx-RetransmissionTimerDL/drx-RetransmissionTimerUL runs; (2) a period of time in which ra-ContentionResolutionTimer runs, where ra-ContentionResolutionTimer is for receiving a Msg 4 in a random access process; (3) a period of time in which an SR is suspended, where the terminal device sends the scheduling request (scheduling request, SR) on a PUCCH; and (4) a period of time in which the terminal device is in a collision-free random access process, where the terminal device successfully receives a random access response (random access response, RAR) but does not receive newly transmitted data scheduled by a PDCCH that is scrambled by using a cell radio network temporary identifier (cell radio network temporary identifier, C-RNTI).

As described above, an SPS resource is a periodic downlink resource configured by the network device for the terminal device. Different from a dynamic scheduling resource (where a HARQ resource corresponding to the dynamic scheduling resource is dynamically indicated by using DCI), a HARQ resource corresponding to the SPS resource alternatively is configured by the network device in a semi-persistent manner. However, in a time division duplex (TDD) system, configuring the HARQ resource corresponding to the SPS resource in the semi-persistent manner results in overlap between a HARQ resource corresponding to a part of SPS resources (for example, a first HARQ resource corresponding to a first SPS resource) and a downlink resource. Consequently, the terminal device is unable to send, on the first HARQ resource, feedback information for a HARQ process corresponding to the first SPS resource. To resolve this problem, a possible solution is as follows. The network device dynamically triggers retransmission of the feedback information. For example, the network device indicates a new HARQ resource (which is referred to as a second HARQ resource) to the terminal device by using DCI, so that the terminal device can send, on the second HARQ resource, the feedback information for the HARQ process corresponding to the first SPS resource.

However, if a DRX function is configured for the terminal device, the terminal device is in DRX dormant mode in a period of time before and after the first SPS resource, in other words, the terminal device does not monitor DCI scheduled by the network device. Consequently, the network device is unable to indicate, to the terminal device in a timely manner by using the DCI, a retransmission resource for the feedback information, and the terminal device is unable to send, to the network device in a timely manner, the feedback information for the HARQ process corresponding to the first SPS resource. This affects downlink transmission efficiency.

Based on this, some embodiments provide a communication method, to improve the downlink transmission efficiency.

The following describes in detail the communication method provided with reference to Embodiment 5 and Embodiment 6.

Embodiment 5

In Embodiment 5, a terminal device receives configuration information from a network device. The configuration information is for configuring a first SPS resource and a first HARQ resource corresponding to the first SPS resource. When the terminal device determines that feedback information for a HARQ process corresponding to the first SPS resource is unable to be sent on the first HARQ resource, the terminal device is in DRX active mode in a first time period, to receive DCI (that indicates a retransmission resource for the feedback information) sent by the network device. The following describes a possible implementation procedure with reference to FIG. 9.

Figure 9:
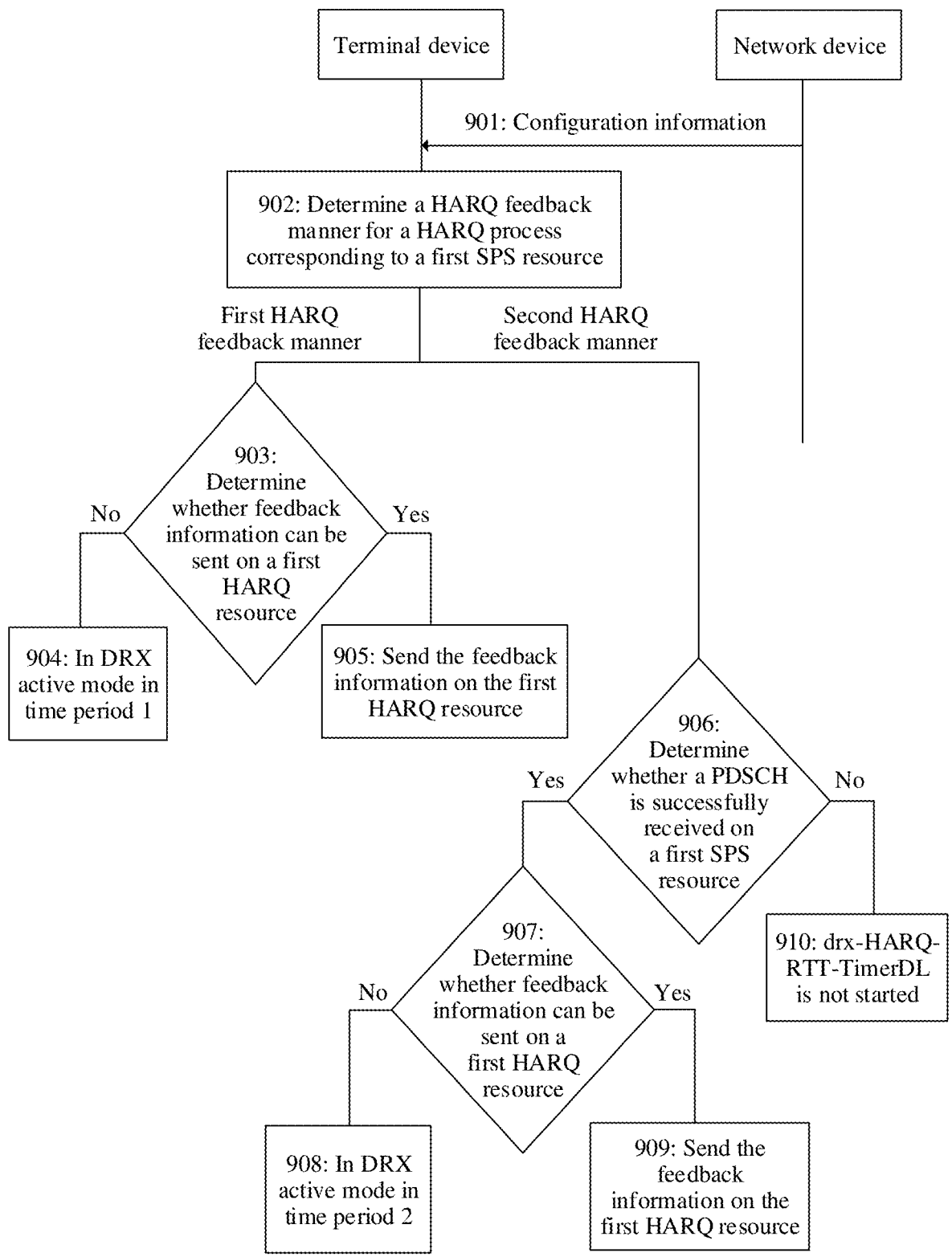
FIG. 9 is a schematic flowchart corresponding to a communication method according to Embodiment 5.

FIG. 9 is a schematic flowchart corresponding to a communication method according to Embodiment 5 of this application. As shown in FIG. 9, the method includes the following steps.

Step 901: A network device sends configuration information to a terminal device, where the configuration information is for configuring a first SPS resource and a first HARQ resource corresponding to the first SPS resource. Accordingly, the terminal device receives the configuration information from the network device.

For example, the configuration information includes configuration information 1 and configuration information 2. Configuration information 1 is for configuring the first SPS resource, and configuration information 2 is for configuring the first HARQ resource. For an implementation of configuring the first SPS resource by using configuration information 1, refer to the foregoing descriptions related to the SPS resource. For example, the network device sends an RRC message to the terminal device. The RRC message includes configuration information 1. Configuration information 1 includes a parameter such as a periodicity of an SPS resource. Each periodicity includes one SPS resource, and the first SPS resource is an SPS resource in a periodicity. For an implementation of configuring the first HARQ resource by using configuration information 2, adaptively refer to the implementation of configuring the first SPS resource by using configuration information 1. A plurality of HARQ resources configured by using configuration information 2 is in a one-to-one correspondence with a plurality of SPS resources configured by using configuration information 1.

In some embodiments, the network device sends configuration information 1 and configuration information 2 to the terminal device by using a same RRC message, or sends configuration information 1 and configuration information 2 to the terminal device by using different RRC messages. This is not limited.

Step 902: The terminal device determines a HARQ feedback manner for a HARQ process corresponding to the first SPS resource. If the HARQ feedback manner for the HARQ process corresponding to the first SPS resource is a first HARQ feedback manner, step S903 is performed. If the HARQ feedback manner for the HARQ process corresponding to the first SPS resource is a second HARQ feedback manner, step S906 is performed.

Herein, the first HARQ feedback manner is a normal HARQ feedback manner. When the HARQ feedback manner for the HARQ process corresponding to the first SPS resource is the normal HARQ feedback manner if the terminal device receives a data packet from the HARQ process, and the data packet is successfully decoded, the terminal device feeds back, on a corresponding HARQ resource, an ACK for transmission corresponding to the HARQ process; or if the terminal device receives a data packet from the HARQ process, and the data packet fails to be decoded, the terminal device feeds back, on a corresponding HARQ resource, a NACK for transmission corresponding to the HARQ process; or if the terminal device does not receive a data packet from the HARQ process, the terminal device feeds back, on a corresponding HARQ resource, a NACK for transmission corresponding to the HARQ process.

The second HARQ feedback manner is skipping NACK feedback or is ACK-only feedback. When the HARQ feedback manner for the HARQ process corresponding to the first SPS resource is skipping NACK feedback or is ACK-only feedback: if the terminal device receives a data packet from the HARQ process, and the data packet is successfully decoded, the terminal device feeds back an ACK for transmission of the HARQ process; or if the terminal device receives a data packet from the HARQ process, and the data packet fails to be decoded, the terminal device does not perform HARQ feedback for transmission of the HARQ process, that is, neither an ACK nor a NACK is fed back; or if the terminal device does not receive a data packet from the HARQ process, the terminal device does not perform HARQ feedback for transmission of the HARQ process.

There is a plurality of implementations in which the terminal device determines the HARQ feedback manner for the HARQ process corresponding to the first SPS resource. In an example, the terminal device determines, based on a configuration of the network device, whether the HARQ feedback manner for the HARQ process corresponding to the first SPS resource is configured as the second HARQ feedback manner. If the HARQ feedback manner for the HARQ process corresponding to the first SPS resource is not configured as the second HARQ feedback manner, the HARQ feedback manner for the HARQ process corresponding to the first SPS resource is the first HARQ feedback manner.

In addition, the terminal device alternatively determines, in the manners described in Embodiment 1 to Embodiment 4, the HARQ feedback manner for the HARQ process corresponding to the first SPS resource.

Step 903: The terminal device determines whether feedback information for the HARQ process corresponding to the first SPS resource can be sent on the first HARQ resource. If the terminal device determines that the feedback information for the HARQ process corresponding to the first SPS resource is unable to be sent on the first HARQ resource, step 904 is performed. If the terminal device determines that the feedback information for the HARQ process corresponding to the first SPS resource can be sent on the first HARQ resource, step 905 is performed.

Herein, that the terminal device determines that the feedback information for the HARQ process corresponding to the first SPS resource is unable to be sent on the first HARQ resource includes a plurality of possible cases. For example, the terminal device determines that the first HARQ resource and a first resource overlap, where the first resource is for transmitting downlink information. For example, the first resource is a downlink resource in a TDD system. In this case, the feedback information for the HARQ process corresponding to the first SPS resource is unable to be sent on the first HARQ resource. For another example, the terminal device determines that the first HARQ resource and a second resource overlap, where the second resource is for transmitting uplink information, and a priority of the feedback information for the HARQ process corresponding to the first SPS resource is lower than a priority of the uplink information. In this case, the feedback information for the HARQ process corresponding to the first SPS resource is unable to be sent on the first HARQ resource. The uplink information is information carried on a PUSCH, or information carried on a PUCCH. This is not limited.

In some embodiments, the first HARQ resource and a first resource overlap means that the first HARQ resource and the first resource completely or partially overlap. That the first HARQ resource and a second resource overlap means that the first HARQ resource and the second resource completely or partially overlap.

Step 904: The terminal device is in DRX active mode in time period 1, to receive DCI sent by the network device, where the DCI indicates a second HARQ resource, and the second HARQ resource is for carrying the feedback information for the HARQ process corresponding to the first SPS resource, in other words, the second HARQ resource is a retransmission resource for the feedback information.

Herein, a start moment of time period 1 is determined based on the first SPS resource. For example, the start moment of time period 1 is any one of the following moments: (1) a start moment of the first SPS resource; (2) a moment obtained by translating the start moment of the first SPS resource by k1 time units; (3) an end moment of the first SPS resource; and (4) a moment obtained by translating the end moment of the first SPS resource by k2 time units. The time unit is a symbol. k1 and k2 is positive integers or negative integers, and k1 and k2 is the same, or is different. A value of k1 or k2 is predetermined in a protocol, or is configured by the network device for the terminal device. For example, the network device configures the value of k1 or k2 by using an RRC message. For example, the start moment of the first SPS resource is a start moment of the 1$^{st}$ symbol occupied by the first SPS resource. For example, if the 1$^{st}$ symbol occupied by the first SPS resource is symbol 2, and k1 is 1, the moment obtained by translating the start moment of the first SPS resource by k1 time units is a start moment of symbol 3.

When the terminal device is in DRX active mode, the terminal device monitors a PDCCH. If the terminal device receives the DCI from the network device, where the DCI indicates the second HARQ resource, the terminal device determines an end moment of time period 1 based on a receiving moment of the DCI. For example, the end moment of time period 1 is the receiving moment of the DCI.

In this embodiment of this application, there is a plurality of implementations in which the terminal device is in DRX active mode in time period 1. The following provides descriptions with reference to two examples (Example 1 and Example 2).

Example 1: The terminal device starts, at the start moment of time period 1, timer 1 associated with the HARQ process corresponding to the first SPS resource; and stop timer 1 at the end moment of time period 1. While timer 1 is running, the terminal device is in DRX active mode. Timer 1 is a newly introduced timer, or is drx-RetransmissionTimerDL.

Example 2: The terminal device enters DRX active mode at the start moment of time period 1, and enter DRX dormant mode at the end moment of time period 1. In this example, timer 1 is unable to be used to constrain the terminal device to be or not to be in DRX active mode.

In Example 2, if the terminal device is in DRX dormant mode before the start moment of time period 1, the terminal device enters DRX active mode from DRX dormant mode at the start moment of time period 1; or if the terminal device has already been in DRX active mode before the start moment of time period 1, the terminal device needs to remain in DRX active mode in time period 1. In addition, at the end moment of time period 1, the terminal device enters DRX dormant mode, or is unable to enter DRX dormant mode. For example, at the end moment of time period 1, the terminal device determines whether there is another factor (refer to the foregoing descriptions) that recommends the terminal device to be in DRX active mode. If there is no such factor, the terminal device enters DRX dormant mode from DRX active mode at the end moment of time period 1; or if there is such a factor, the terminal device continues to remain in DRX active mode. In other words, in this embodiment of this application, the terminal device is constrained to be in DRX active mode in time period 1, but a mode of the terminal device beyond time period 1 is not limited. For example, refer to the conventional technology for implementation beyond time period 1.

Step 905: The terminal device sends, on the first HARQ resource, the feedback information for the HARQ process corresponding to the first SPS resource.

For example, after sending, on the first HARQ resource, the feedback information for the HARQ process corresponding to the first SPS resource, the terminal device further starts drx-HARQ-RTT-TimerDL. Further, if drx-RetransmissionTimerDL is running, the terminal device stops drx-RetransmissionTimerDL.

Step 906: The terminal device determines whether a PDSCH is successfully received on the first SPS resource. If the terminal device determines that the PDSCH is successfully received on the first SPS resource, S907 is performed. If the terminal device determines that the PDSCH fails to be received on the first SPS resource, step S910 is performed.

Herein, that the terminal device determines that the PDSCH is successfully received on the first SPS resource means: The terminal device receives a data packet from the HARQ process corresponding to the first SPS resource, and the data packet is successfully decoded. That the terminal device determines that the PDSCH fails to be received on the first SPS resource means: The terminal device receives a data packet from the HARQ process corresponding to the first SPS resource, and the data packet fails to be decoded; or the terminal device does not receive a data packet from the HARQ process corresponding to the first SPS resource. In a possible implementation, the network device sends indication information to the terminal device, where the indication information indicates that the first SPS resource is skipped (skip), so that the terminal device determines, based on the indication information, that the terminal device does not receive a data packet from the HARQ process corresponding to the first SPS resource.

Step 907: The terminal device determines whether feedback information for the HARQ process corresponding to the first SPS resource can be sent on the first HARQ resource. If the terminal device determines that the feedback information for the HARQ process corresponding to the first SPS resource is unable to be sent on the first HARQ resource, step 908 is performed. If the terminal device determines that the feedback information for the HARQ process corresponding to the first SPS resource can be sent on the first HARQ resource, step 909 is performed.

Herein, for a case in which the terminal device determines that the feedback information for the HARQ process corresponding to the first SPS resource is unable to be sent on the first HARQ resource, refer to the descriptions in step 903.

Step 908: The terminal device is in DRX active mode in time period 2, to receive DCI sent by the network device, where the DCI indicates a second HARQ resource, and the second HARQ resource is for carrying the feedback information for the HARQ process corresponding to the first SPS resource, in other words, the second HARQ resource is a retransmission resource for the feedback information.

Herein, a start moment of time period 2 is determined based on a time domain resource occupied by the PDSCH received on the first SPS resource. For example, the start moment of time period 2 is any one of the following moments: (1) a start moment of the time domain resource occupied by the PDSCH; (2) a moment obtained by translating, by m time units, the start moment of the time domain resource occupied by the PDSCH; (3) an end moment of the time domain resource occupied by the PDSCH; and (4) a moment obtained by translating, by n time units, the end moment of the time domain resource occupied by the PDSCH. The time unit is a symbol. m and n is positive integers or negative integers, and m and n is the same, or is different. A value of m or n is predetermined in a protocol, or is configured by the network device for the terminal device. For example, the network device configures the value of m or n by using an RRC message.

When the terminal device is in DRX active mode, the terminal device monitors a PDCCH. If the terminal device receives the DCI from the network device, where the DCI indicates the second HARQ resource, the terminal device determines an end moment of time period 2 based on a receiving moment of the DCI. For example, the end moment of time period 2 is the receiving moment of the DCI.

In this embodiment of this application, there is a plurality of implementations in which the terminal device is in DRX active mode in time period 2. The following provides descriptions with reference to two examples (Example 1 and Example 2).

Example 1: The terminal device starts, at the start moment of time period 2, timer 2 associated with the HARQ process corresponding to the first SPS resource; and stop timer 2 at the end moment of time period 2. While timer 2 is running, the terminal device is in DRX active mode. Timer 2 is a newly introduced timer, or is drx-RetransmissionTimerDL.

Example 2: The terminal device enters DRX active mode at the start moment of time period 2, and enter DRX dormant mode at the end moment of time period 2. In this example, timer 2 is unable to be used to constrain the terminal device to be or not to be in DRX active mode.

In Example 2, if the terminal device is in DRX dormant mode before the start moment of time period 2, the terminal device enters DRX active mode from DRX dormant mode at the start moment of time period 2; or if the terminal device has already been in DRX active mode before the start moment of time period 2, the terminal device needs to remain in DRX active mode in time period 2. In addition, at the end moment of time period 2, the terminal device enters DRX dormant mode, or is unable to enter DRX dormant mode. For example, at the end moment of time period 2, the terminal device determines whether there is another factor (refer to the foregoing descriptions) that recommends the terminal device to be in DRX active mode. If there is no such factor, the terminal device enters DRX dormant mode from DRX active mode at the end moment of time period 2; or if there is such a factor, the terminal device continues to remain in DRX active mode. In other words, in this embodiment of this application, the terminal device is constrained to be in DRX active mode in time period 2, but a mode of the terminal device beyond time period 2 is not limited. For example, refer to the conventional technology for implementation beyond time period 2.

Step 909: The terminal device sends, on the first HARQ resource, the feedback information for the HARQ process corresponding to the first SPS resource.

For example, after sending, on the first HARQ resource, the feedback information for the HARQ process corresponding to the first SPS resource, the terminal device further starts drx-HARQ-RTT-TimerDL. Further, if drx-RetransmissionTimerDL is running, the terminal device stops drx-RetransmissionTimerDL.

Step 910: The terminal device is unable to start drx-HARQ-RTT-TimerDL.

For example, if drx-RetransmissionTimerDL is running, the terminal device is unable to stop drx-RetransmissionTimerDL.

In the foregoing manner, when the feedback manner for the HARQ process corresponding to the first SPS resource is the first HARQ feedback manner, because the terminal device needs to send the feedback information (an ACK or a NACK) to the network device, the terminal device is in DRX active mode in time period 1 when the feedback information is unable to be sent on the first HARQ resource corresponding to the first SPS resource, regardless of whether the terminal device successfully receives the PDSCH on the first SPS resource, to receive, in a timely manner, the DCI that is sent by the network device and that indicates the retransmission resource for the feedback information, so that the feedback information for the HARQ process corresponding to the first SPS resource can be sent to the network device in a timely manner, to improve downlink transmission efficiency. However, when the feedback manner for the HARQ process corresponding to the first SPS resource is the second HARQ feedback manner (skipping NACK feedback), if the terminal device fails to receive the PDSCH on the first SPS resource, the terminal device does not need to be in active mode to receive the DCI (which indicates the retransmission resource for the feedback information) sent by the network device even if the terminal device is unable to send the feedback information on the first HARQ resource corresponding to the first SPS resource because the terminal device does not need to feed back a NACK, so that the terminal device is effectively prevented from performing an operation, to reduce processing complexity and power consumption of the terminal device.

In some embodiments, the foregoing content is described from the perspective that the feedback manner for the HARQ process corresponding to the first SPS resource is the first HARQ feedback manner or the second HARQ feedback manner. If the feedback manner for the HARQ process corresponding to the first SPS resource is another possible HARQ feedback manner, adaptively refer to the foregoing descriptions for implementation.

Embodiment 6

Figure 10:
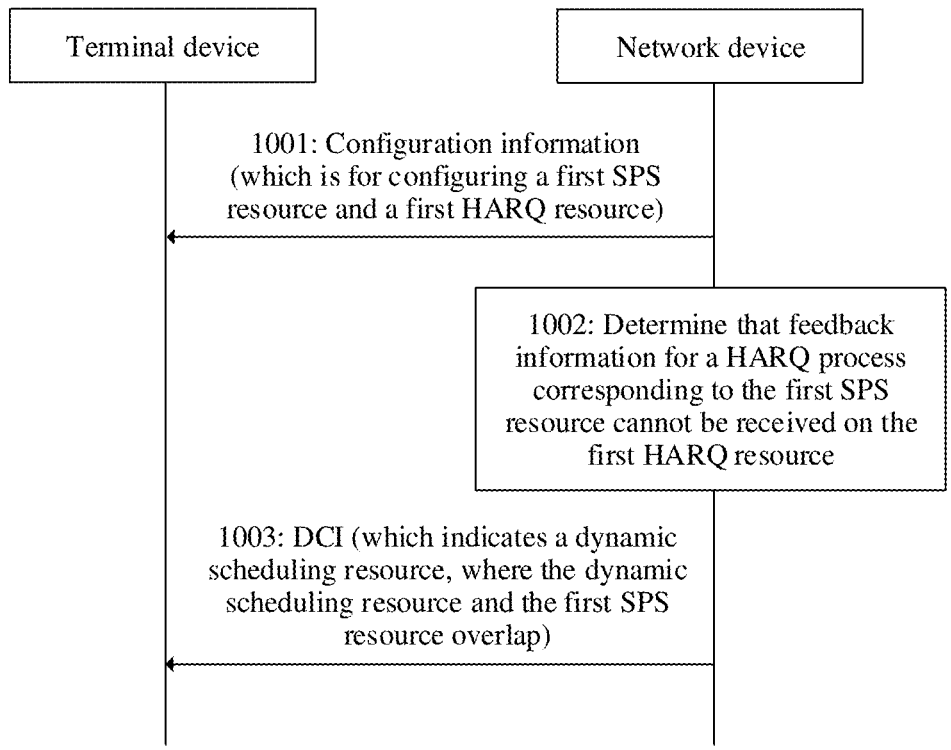
FIG. 10 is a schematic flowchart corresponding to a communication method according to Embodiment 6.

FIG. 10 is a schematic flowchart corresponding to a communication method according to Embodiment 6 of this application. As shown in FIG. 10, the method includes the following steps.

Step 1001: A network device sends configuration information to a terminal device, where the configuration information is for configuring a first SPS resource and a first HARQ resource corresponding to the first SPS resource. Accordingly, the terminal device receives the configuration information from the network device.

For example, for related implementation of step 1001, refer to the descriptions of step 901 in Embodiment 5.

Step 1002: The network device determines that feedback information for a HARQ process corresponding to the first SPS resource is unable to be received on the first HARQ resource.

Herein, that the network device determines that feedback information for a HARQ process corresponding to the first SPS resource is unable to be received on the first HARQ resource is alternatively described as: The network device determines that the terminal device is unable to send, on the first HARQ resource, feedback information for a HARQ process corresponding to the first SPS resource.

That the network device determines that feedback information for a HARQ process corresponding to the first SPS resource is unable to be received on the first HARQ resource includes a plurality of possible cases. For example, the network device determines that the first HARQ resource and a first resource overlap, where the first resource is for transmitting downlink information, and the first resource is, for example, a downlink resource in a TDD system. In this case, the feedback information for the HARQ process corresponding to the first SPS resource is unable to be received on the first HARQ resource. For another example, the network device determines that the first HARQ resource and a second resource overlap, where the second resource is for transmitting uplink information, and a priority of the feedback information for the HARQ process corresponding to the first SPS resource is lower than a priority of the uplink information. In this case, the feedback information for the HARQ process corresponding to the first SPS resource is unable to be received on the first HARQ resource. The uplink information is information carried on a PUSCH, or information carried on a PUCCH. This is not limited.

Step 1003: The network device sends DCI to the terminal device, where the DCI indicates a dynamic scheduling resource, and the dynamic scheduling resource and the first SPS resource overlap. Accordingly, the terminal device receives the DCI.

For example, the DCI further indicates a third HARQ resource, and the third HARQ resource is for carrying feedback information for a HARQ process corresponding to the dynamic scheduling resource.

For example, that the dynamic scheduling resource and the first SPS resource overlap means that the dynamic scheduling resource and the first SPS resource completely or partially overlap.

In this embodiment of this application, if the terminal device determines that a dynamic scheduling resource scheduled by the network device and an SPS resource overlap, the terminal device processes the dynamic scheduling resource but does not process the SPS resource. Therefore, in step 1003, after receiving the DCI, the terminal device receives, on the dynamic scheduling resource based on the DCI, a PDSCH sent by the network device; and send, on the third HARQ resource indicated by the DCI, the feedback information for the HARQ process corresponding to the dynamic scheduling resource.

In the foregoing manner, when the network device determines that the feedback information for the HARQ process corresponding to the first SPS resource is unable to be received on the first HARQ resource, the network device indicates, to the terminal device, the dynamic scheduling resource that overlaps the first SPS resource and a HARQ resource corresponding to the dynamic scheduling resource. The network device flexibly indicates the HARQ resource corresponding to the dynamic scheduling resource, so that a problem that the terminal device is unable to send the feedback information to the network device in a timely manner can be effectively avoided, thereby improving downlink transmission efficiency.

The following is noted. (1) The foregoing Embodiment 2 to Embodiment 4 are some possible implementations described based on Embodiment 1, and mutual reference is made between different embodiments of Embodiment 1 to Embodiment 4. For example, for a implementation in which the DCI indicates the HARQ feedback manner based on the used DCI format or scrambling manner in Embodiment 3, refer to Embodiment 2.

(2) Serial numbers of steps in the flowcharts (for example, FIG. 5 to FIG. 10) described in Embodiment 1 to Embodiment 6 are an example of an execution procedure, and do not constitute any limitation on an execution sequence of the steps. In some embodiments, there is no strict execution sequence between steps that do not have a time sequence dependency relationship with each other. In addition, not all steps shown in the flowcharts are performed as shown, and some steps is added or deleted based on the flowcharts according to actual constraints.

The foregoing mainly describes the solutions provided in some embodiments from a perspective of interaction between communication apparatuses. In some embodiments, to implement the foregoing functions, the communication apparatus includes corresponding hardware structures and/or software modules for performing the functions. A person skilled in the art is easily aware that, in combination with units and algorithm steps of the examples described in some embodiments, some embodiments are implemented by hardware or a combination of hardware and computer software. Whether a function is performed by hardware or hardware driven by computer software depends on particular applications and design constraints of the technical solutions. A person skilled in the art is configured to use different methods to implement the described functions for each particular application, but an implementation beyond the scope of this disclosure is unrealistic.

In some embodiments, the communication apparatus is divided into functional units based on the foregoing method examples. For example, the communication apparatus is divided into each functional unit based on a corresponding function, or two or more functions is integrated into one unit. The integrated unit is implemented in a form of hardware, or is implemented in a form of a software functional unit.

Figure 11:
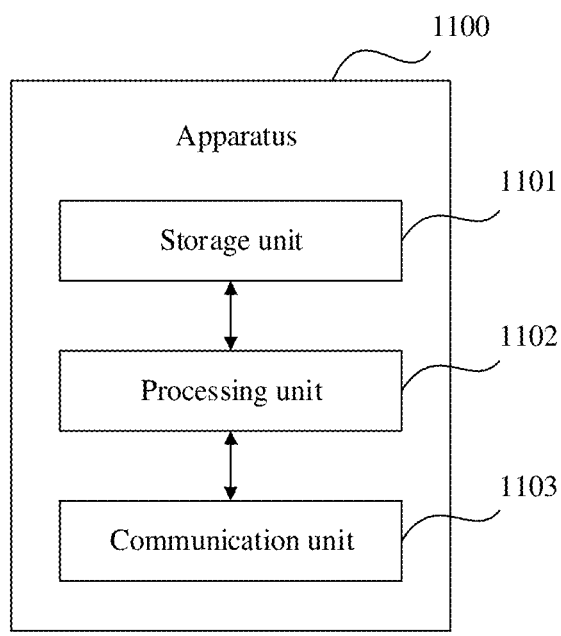
FIG. 11 is a possible example block diagram of an apparatus, in accordance with some embodiments, in accordance with some embodiments.

When the integrated unit is used, FIG. 11 is a possible example block diagram of an apparatus, in accordance with some embodiments. As shown in FIG. 11, the apparatus 1100 includes a processing unit 1102 and a communication unit 1103. The processing unit 1102 is configured to control and manage an action of the apparatus 1100. The communication unit 1103 is configured to support the apparatus 1100 in communicating with another device. Optionally, the communication unit 1103 is further referred to as a transceiver unit, and includes a receiving unit and/or a sending unit, respectively configured to perform a receiving operation and a sending operation. The apparatus 1100 further includes a storage unit 1101, configured to store program code and/or data of the apparatus 1100.

The apparatus 1100 is the terminal device in any one of the foregoing embodiments, or is a chip disposed in the terminal device. The processing unit 1102 supports the apparatus 1100 in performing an action of the terminal device in the foregoing method examples. Alternatively, the processing unit 1102 mainly performs an internal action of the terminal device in the method examples, and the communication unit 1103 supports communication between the apparatus 1100 and a network device. For example, the communication unit 1103 is configured to perform step 502 in FIG. 5, and the processing unit 1102 is configured to perform step 503 and step 504 in FIG. 5.

In an embodiment, the communication unit 1103 is configured to receive first information from a network device; and the processing unit 1102 is configured to: determine a HARQ feedback manner based on the first information, where the HARQ feedback manner includes skipping ACK feedback and/or NACK feedback; and perform feedback processing for a first HARQ process based on the HARQ feedback manner.

In a possible design, the processing unit 1102 is configured to: when the HARQ feedback manner includes skipping ACK feedback, and in response to a determination that the communication unit 1103 receives a data packet from the first HARQ process and the data packet is successfully decoded, skip feeding back an ACK to the first HARQ process; or when the HARQ feedback manner includes skipping NACK feedback, and in response to a determination that the communication unit 1103 receives a data packet from the first HARQ process and the data packet fails to be decoded, skip feeding back a NACK to the first HARQ process; or in response to a determination that the communication unit 1103 does not receive a data packet from the first HARQ process, skip feeding back a NACK to the first HARQ process; or when the HARQ feedback manner includes skipping ACK feedback and NACK feedback, skip feeding back an ACK and a NACK to the first HARQ process.

In a possible design, the first information includes indication information, and the indication information indicates the HARQ feedback manner.

In a possible design, the first HARQ process is a HARQ process corresponding to an SPS resource. The communication unit 1103 is further configured to receive an RRC message from the network device, where the RRC message includes the indication information, and the RRC message is for configuring the SPS resource. Alternatively, the communication unit 1103 is further configured to receive DCI from the network device, where the DCI includes the indication information, and the DCI is for activating or reactivating the SPS resource.

In a possible design, the first HARQ process is a HARQ process corresponding to a dynamic scheduling resource. The communication unit 1103 is further configured to receive DCI from the network device, where the DCI includes the indication information, and the DCI is for scheduling the dynamic scheduling resource.

In a possible design, the communication unit 1103 is further configured to receive a first message from the network device, where the first message includes the indication information, and the first message is a PDCP layer control message, an RLC layer control message, or a MAC layer control message.

In a possible design, the communication unit 1103 is further configured to receive a data packet from the network device, where the data packet includes the indication information, and the data packet is sent by using the first HARQ process.

In a possible design, the first HARQ process is a HARQ process corresponding to a first service. The communication unit 1103 is further configured to receive an RRC message from the network device, where the RRC message includes the indication information, and the RRC message is for configuring a logical channel corresponding to the first service.

In a possible design, the first HARQ process is a HARQ process corresponding to an SPS resource. The first information includes an RRC message, the RRC message is for configuring a PUCCH resource, and the PUCCH resource is for carrying feedback information for the HARQ process corresponding to the SPS resource. The processing unit 1102 is further configured to determine the HARQ feedback manner depending on whether the RRC message carries configuration information of the PUCCH resource.

In a possible design, the first information includes DCI, and the processing unit 1102 is further configured to determine the HARQ feedback manner based on a DCI format or a DCI scrambling manner.

In a possible design, the first HARQ process is a HARQ process corresponding to an SPS resource, and the DCI indicates to activate or reactivate the SPS resource; or the first HARQ process is a HARQ process corresponding to a dynamic scheduling resource, and the DCI is for scheduling the dynamic scheduling resource.

In a possible design, the first HARQ process is a HARQ process corresponding to a first service. The first information includes preset priority information. The processing unit 1102 is further configured to determine the HARQ feedback manner based on a priority of a logical channel corresponding to the first service and the preset priority information.

In a possible design, the communication unit 1103 is further configured to receive second information from the network device, where the second information indicates at least one HARQ process to which the HARQ feedback manner is applicable, and the at least one HARQ process includes the first HARQ process.

In still another embodiment, the communication unit 1103 is configured to receive configuration information from a network device, where the configuration information is for configuring a first SPS resource and a first HARQ resource corresponding to the first SPS resource; the processing unit 1102 is configured to determine that feedback information for a HARQ process corresponding to the first SPS resource is unable to be sent on the first HARQ resource; and the apparatus 1100 is in DRX active mode in a first time period, and a start moment of the first time period is determined based on the first SPS resource.

In a possible design, the communication unit 1103 is further configured to receive DCI from the network device, where the DCI indicates a second HARQ resource, the second HARQ resource is for carrying the feedback information, and an end moment of the first time period is a receiving moment of the DCI.

In a possible design, the processing unit 1102 is configured to control the terminal device to enter DRX active mode at the start moment of the first time period, and enter DRX dormant mode at the end moment of the first time period.

In a possible design, the processing unit 1102 is configured to start a timer corresponding to the HARQ process at the start moment of the first time period, and stop the timer at the end moment of the first time period, where the terminal device is in DRX active mode while the timer is running In a possible design, the timer is an uplink DRX retransmission timer.

In a possible design, the processing unit 1102 is further configured to determine that a PDSCH is successfully received on the first SPS resource.

In a possible design, that a start moment of the first time period is determined based on the first SPS resource includes: The start moment of the first time period is determined based on a time domain resource occupied by the PDSCH received on the first SPS resource.

In a possible design, the start moment of the first time period is any one of the following moments: a start moment of the time domain resource occupied by the PDSCH; a moment obtained by translating, by m time units, the start moment of the time domain resource occupied by the PDSCH; an end moment of the time domain resource occupied by the PDSCH; and a moment obtained by translating, by n time units, the end moment of the time domain resource occupied by the PDSCH, where m and n are integers.

In a possible design, a HARQ feedback manner for the HARQ process is skipping NACK feedback.

In a possible design, that the processing unit 1102 determines that HARQ feedback information is unable to be sent on the first HARQ resource includes: The processing unit 1102 determines that the first HARQ resource and a first resource overlap, where the first resource is for transmitting downlink information; or determines that the first HARQ resource and a second resource overlap, where the second resource is for transmitting uplink information, and a priority of the HARQ feedback information is lower than a priority of the uplink information.

The apparatus 1100 is the network device in any one of the foregoing embodiments, or is a chip disposed in the network device. The processing unit 1102 supports the apparatus 1100 in performing an action of the network device in the foregoing method examples. Alternatively, the processing unit 1102 mainly performs an internal action of the network device in the method examples, and the communication unit 1103 supports communication between the apparatus 1100 and a terminal device. For example, the communication unit 1103 is configured to perform step 501 in FIG. 5.

In an embodiment, the processing unit 1102 is configured to determine a HARQ feedback manner, where the HARQ feedback manner includes skipping ACK and/or NACK; and the communication unit 1103 is configured to send first information to a terminal device, where the first information is used by the terminal device to determine the HARQ feedback manner.

In a possible design, the first information includes indication information, and the indication information indicates the HARQ feedback manner.

In a possible design, the communication unit 1103 is further configured to send a first message to the terminal device, where the first message includes the indication information, and the first message is an RRC message, a PDCP layer control message, an RLC layer control message, a MAC layer control message, or DCI. Alternatively, the communication unit 1103 is further configured to send a data packet to the terminal device, where the data packet includes the indication information.

In a possible design, the RRC message is for configuring an SPS resource or configuring a logical channel corresponding to a first service; or the DCI is for activating or reactivating an SPS resource or scheduling a dynamic scheduling resource.

In a possible design, the first information includes an RRC message, the RRC message is for configuring a PUCCH resource, and the PUCCH resource is for carrying feedback information for a HARQ process corresponding to an SPS resource. When the RRC message does not carry configuration information of the PUCCH resource, the RRC message indicates the HARQ feedback manner.

In a possible design, the first information includes DCI, and a DCI format or a DCI scrambling manner is for indicating the HARQ feedback manner.

In a possible design, the DCI indicates to activate or reactivate an SPS resource, or the DCI is for scheduling a dynamic scheduling resource.

In a possible design, the first information includes preset priority information.

In a possible design, the communication unit 1103 is further configured to send second information to the terminal device, where the second information indicates the at least one HARQ process to which the HARQ feedback manner is applicable.

In another embodiment, the communication unit 1103 is configured to send configuration information to a terminal device, where the configuration information is for configuring a first SPS resource and a first HARQ resource corresponding to the first SPS resource; the processing unit 1102 is configured to determine that feedback information for a HARQ process corresponding to the first SPS resource is unable to be received on the first HARQ resource; and the communication unit 1103 is further configured to send DCI to the terminal device, where the DCI indicates a dynamic scheduling resource, where the dynamic scheduling resource and the first SPS resource overlap.

In a possible design, the DCI further indicates a third HARQ resource, and the third HARQ resource is for carrying feedback information for a HARQ process corresponding to the dynamic scheduling resource.

In a possible design, that the processing unit 1102 determines that feedback information for a HARQ process corresponding to the first SPS resource is unable to be received on the first HARQ resource includes: The processing unit 1102 determines that the first HARQ resource and a first resource overlap, where the first resource is for transmitting downlink information; or the processing unit 1102 determines that the first HARQ resource and a second resource overlap, where the second resource is for transmitting uplink information, and a priority of the HARQ feedback information is lower than a priority of the uplink information.

In some embodiments, division of the foregoing apparatus into units is division into logical functions. During actual implementation, all or some of the units is integrated into one physical entity, or is physically separated. In addition, the units in the apparatus are implemented in a form in which a processing element invokes software, or is implemented in a form of hardware; or some units is implemented in a form of software invoked by a processing element, and some units is implemented in a form of hardware. For example, the units is separately disposed processing elements, or is integrated into a chip of the apparatus for implementation. In addition, the units is stored in a memory in a form of a program, and is invoked by a processing element of the apparatus to perform functions of the units. In addition, all or some of the units is integrated, or is implemented independently. The processing element herein further is referred to as a processor, and is an integrated circuit having a signal processing capability. During implementation, steps in the foregoing methods or the foregoing units is implemented by using a hardware integrated logic circuit in the processing element, or is implemented in the form in which a processing element invokes software.

For example, a unit in any one of the foregoing apparatuses is one or more integrated circuits configured to implement the foregoing methods, for example, one or more application-specific integrated circuits (ASICs), one or more digital signal processors (DSPs), one or more field programmable gate arrays (FPGAs), or a combination of at least two of the integrated circuits. For another example, when the unit in the apparatus is implemented by scheduling a program by a processing element, the processing element is a processor, for example, a central processing unit (CPU) or another processor that can invoke the program. For another example, the units is integrated together and implemented in a form of a system-on-a-chip (SOC).

The foregoing receiving unit is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 12:
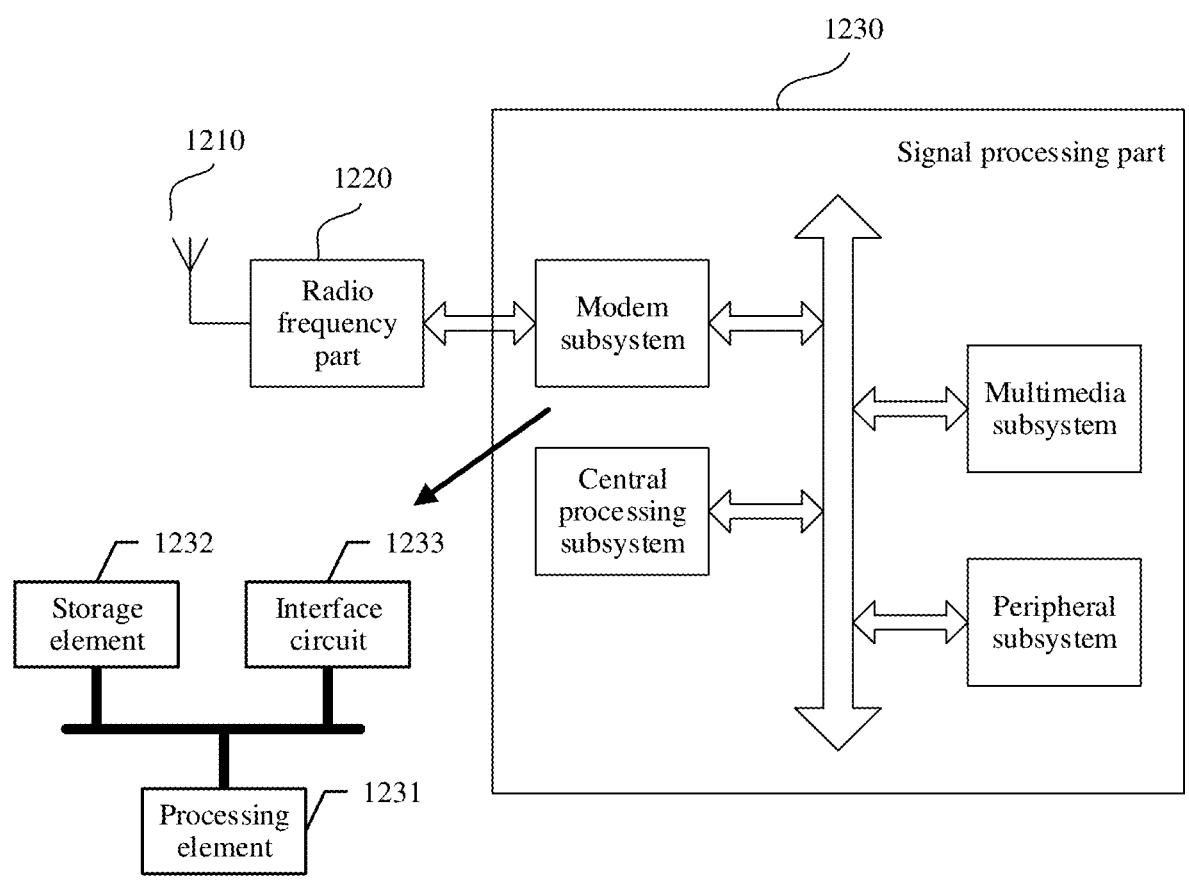
FIG. 12 is a schematic diagram of a structure of a terminal device, in accordance with some embodiments.

FIG. 12 is a schematic diagram of a structure of a terminal device, in accordance with some embodiments. The terminal device is the terminal device in the foregoing embodiments, and is configured to implement operations of the terminal device in the foregoing embodiments. As shown in FIG. 12, the terminal device includes an antenna 1210, a radio frequency part 1220, and a signal processing part 1230. The antenna 1210 is connected to the radio frequency part 1220. In a downlink direction, the radio frequency part 1220 receives, through the antenna 1210, information sent by a network device, and sends, to the signal processing part 1230 for processing, the information sent by the network device. In an uplink direction, the signal processing part 1230 processes information of the terminal device, and sends the processed information to the radio frequency part 1220; and the radio frequency part 1220 processes the information of the terminal device, and then sends the processed information to the network device through the antenna 1210.

The signal processing part 1230 includes a modem subsystem, configured to process data at each communication protocol layer. The signal processing part 1230 further includes a central processing subsystem, configured to process an operating system and an application layer of the terminal device. In addition, the signal processing part 1230 further includes another subsystem, for example, a multimedia subsystem or a peripheral subsystem. The multimedia subsystem is configured to control a camera, a screen display, and the like of the terminal device. The peripheral subsystem is configured to connect to another device. The modem subsystem is a chip that is separately disposed.

The modem subsystem includes one or more processing elements 1231, for example, include one main control CPU and another integrated circuit. In addition, the modem subsystem further includes a storage element 1232 and an interface circuit 1233. The storage element 1232 is configured to store data and a program. However, a program used to perform the method performed by the terminal device in the foregoing methods is unable to be stored in the storage element 1232, but is stored in a memory outside the modem subsystem, and is loaded and used by the modem subsystem when to be used. The interface circuit 1233 is configured to communicate with another subsystem.

The modem subsystem is implemented by a chip. The chip includes at least one processing element and an interface circuit. The processing element is configured to perform the steps of any method performed by the foregoing terminal device. The interface circuit is configured to communicate with another apparatus. In an implementation, units in the terminal device for implementing the steps in the foregoing methods is implemented by scheduling a program by a processing element. For example, the apparatus used in the terminal device includes a processing element and a storage element. The processing element invokes a program stored in the storage element, to perform the methods performed by the terminal device in the foregoing method embodiments. The storage element is a storage element located on a same chip as the processing element, namely, an on-chip storage element.

In another implementation, a program used to perform the method performed by the terminal device in the foregoing methods is in a storage element that is located on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In still another implementation, units in the terminal device for implementing the steps in the foregoing methods is configured as one or more processing elements. These processing elements are disposed in the modem subsystem. The processing element herein is an integrated circuit, for example, one or more ASICs, one or more DSPs, one or more FPGAs, or a combination of these types of integrated circuits. These integrated circuits is integrated together to form a chip.

Units in the terminal device for implementing the steps in the foregoing methods is integrated together, and implemented in a form of an SOC. The SOC chip is configured to implement the foregoing methods. At least one processing element and a storage element is integrated into the chip, and the processing element invokes a program stored in the storage element to implement the foregoing methods performed by the terminal device. Alternatively, at least one integrated circuit is integrated into the chip, to implement the foregoing methods performed by the terminal device. Alternatively, with reference to the foregoing implementations, functions of some units is implemented by invoking a program by the processing element, and functions of some units is implemented by the integrated circuit.

It can be learned that the foregoing apparatus used in the terminal device includes at least one processing element and an interface circuit. The at least one processing element is configured to perform any one of the methods that are provided in the foregoing method embodiments and that are performed by the terminal device. The processing element performs some or all steps performed by the terminal device, in a first manner, by invoking the program stored in the storage element; or performs some or all steps performed by the terminal device, in a second manner, by using a hardware integrated logic circuit in the processing element in combination with instructions; or certainly performs, by combining the first manner and the second manner, some or all steps performed by the terminal device.

The processing element herein is the same as that described above, and is implemented by using a processor. A function of the processing element is the same as a function of the processing unit described in FIG. 11. For example, the processing element is a general-purpose processor, for example, a CPU, or is one or more integrated circuits configured to implement the foregoing methods, for example, one or more ASICs, one or more microprocessors DSPs, one or more FPGAs, or a combination of at least two of these types of integrated circuits. The storage element is implemented by using a memory. A function of the storage element is the same as a function of the storage unit described in FIG. 11. The storage element is one memory, or an umbrella term of a plurality of memories.

The terminal device shown in FIG. 12 can implement the processes related to the terminal device in the method embodiment shown in FIG. 5, FIG. 6, FIG. 7, FIG. 8, FIG. 9, or FIG. 10. Operations and/or functions of the modules in the terminal device shown in FIG. 12 are respectively intended to implement the corresponding procedures in the foregoing method embodiments. For details, refer to the descriptions in the foregoing method embodiments. To avoid repetition, detailed descriptions are properly omitted herein.

Figure 13:
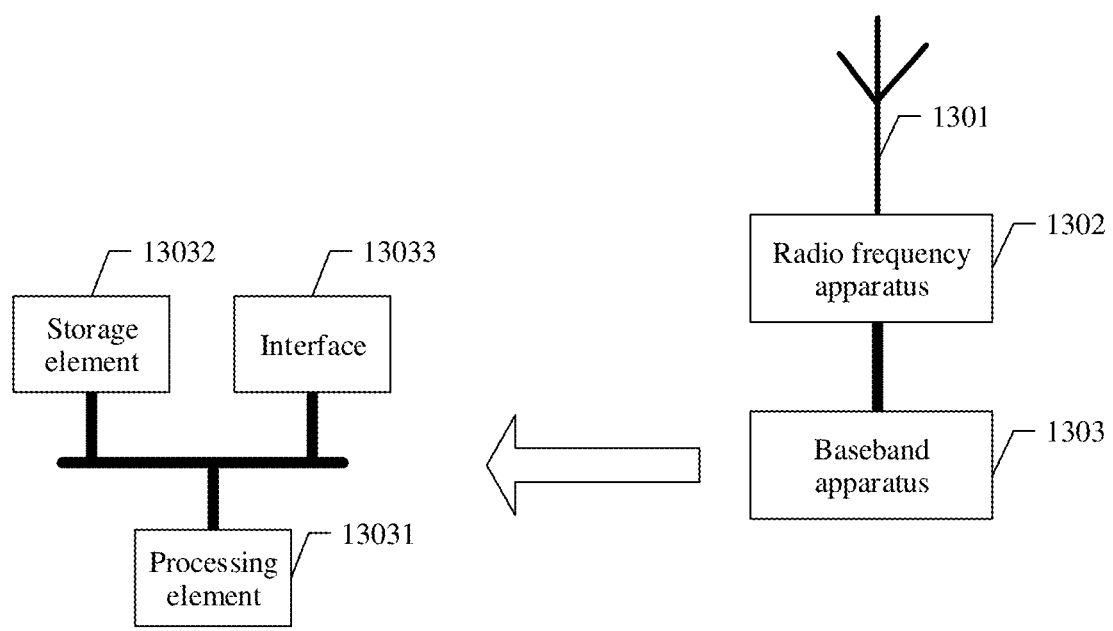
FIG. 13 is a schematic diagram of a structure of a network device, in accordance with some embodiments.

FIG. 13 is a schematic diagram of a structure of a network device, in accordance with some embodiments. The network device is configured to implement operations of the network device in the foregoing embodiments. As shown in FIG. 13, the network device includes an antenna 1301, a radio frequency apparatus 1302, and a baseband apparatus 1303. The antenna 1301 is connected to the radio frequency apparatus 1302. In an uplink direction, the radio frequency apparatus 1302 receives, through the antenna 1301, information sent by a terminal device, and sends, to the baseband apparatus 1303 for processing, the information sent by the terminal device. In a downlink direction, the baseband apparatus 1303 processes information of the terminal device, and sends the processed information to the radio frequency apparatus 1302; and the radio frequency apparatus 1302 processes the information of the terminal device, and then sends the processed information to the terminal device through the antenna 1301.

The baseband apparatus 1303 includes one or more processing elements 13031, for example, include one main control CPU and another integrated circuit. In addition, the baseband apparatus 1303 further includes a storage element 13032 and an interface 13033. The storage element 13032 is configured to store a program and data. The interface 13033 is configured to exchange information with the radio frequency apparatus 1302, and the interface is, for example, a common public radio interface (CPRI). The foregoing apparatus used in the network device is located in the baseband apparatus 1303. For example, the foregoing apparatus used in the network device is a chip on the baseband apparatus 1303. The chip includes at least one processing element and an interface circuit. The processing element is configured to perform the steps of any one of the methods performed by the network device. The interface circuit is configured to communicate with another apparatus. In an implementation, units in the network device for implementing the steps in the foregoing methods is implemented by scheduling a program by a processing element. For example, the apparatus used in the network device includes a processing element and a storage element. The processing element invokes a program stored in the storage element, to perform the method performed by the network device in the foregoing method embodiments. The storage element is a storage element that is located on a same chip as the processing element, namely, an on-chip storage element, or is a storage element that is located on a different chip from the processing element, namely, an off-chip storage element.

In another implementation, units in the network device for implementing the steps in the foregoing methods is configured as one or more processing elements. The processing elements are disposed on the baseband apparatus. The processing element herein is an integrated circuit, for example, one or more ASICs, one or more DSPs, one or more FPGAs, or a combination of these types of integrated circuits. These integrated circuits is integrated together to form a chip.

Units in the network device for implementing the steps in the foregoing methods is integrated together, and implemented in a form of a system-on-a-chip (SOC). For example, the baseband apparatus includes the SOC chip, and is configured to implement the foregoing methods. At least one processing element and a storage element is integrated into the chip, and the processing element invokes a program stored in the storage element to implement the foregoing methods performed by the network device. Alternatively, at least one integrated circuit is integrated into the chip, to implement the foregoing methods performed by the network device. Alternatively, with reference to the foregoing implementations, functions of some units is implemented by invoking a program by the processing element, and functions of some units is implemented by the integrated circuit.

It can be learned that the foregoing apparatus used in the network device includes at least one processing element and an interface circuit. The at least one processing element is configured to perform any one of the methods that are provided in the foregoing method embodiments and that are performed by the network device. The processing element performs some or all steps performed by the network device, in a first manner, by invoking the program stored in the storage element; or performs some or all steps performed by the network device, in a second manner, by using a hardware integrated logic circuit in the processing element in combination with instructions; or certainly performs, by combining the first manner and the second manner, some or all steps performed by the network device.

The processing element herein is the same as that described above, and is implemented by using a processor. A function of the processing element is the same as a function of the processing unit described in FIG. 11. For example, the processing element is a general-purpose processor, for example, a CPU, or is one or more integrated circuits configured to implement the foregoing methods, for example, one or more ASICs, one or more microprocessors DSPs, one or more FPGAs, or a combination of at least two of these types of integrated circuits. The storage element is implemented by using a memory. A function of the storage element is the same as a function of the storage unit described in FIG. 11. The storage element is one memory, or an umbrella term of a plurality of memories.

The network device shown in FIG. 13 can implement the processes related to the network device in the method embodiment shown in FIG. 5, FIG. 6, FIG. 7, FIG. 8, FIG. 9, or FIG. 10. Operations and/or functions of the modules in the network device shown in FIG. 13 are respectively intended to implement the corresponding procedures in the foregoing method embodiments. For details, refer to the descriptions in the foregoing method embodiments. To avoid repetition, detailed descriptions are properly omitted herein.

A person skilled in the art understands that some embodiments is provided as a method, a system, or a computer program product. Therefore, this application is configured to use a form of a hardware embodiment, a software embodiment, or an embodiment with a combination of software and hardware. In addition, this application is configured to use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. In some embodiments, computer program instructions is used to implement each process and/or each block in the flowcharts and/or the block diagrams and a combination of a process and/or a block in the flowcharts and/or the block diagrams. The computer program instructions is provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more processes in the flowcharts and/or in one or more blocks in the block diagrams.

The computer program instructions alternatively is stored in a computer-readable memory that can indicate a computer or another programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions alternatively is loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more processes in the flowcharts and/or in one or more blocks in the block diagrams.

A person skilled in the art is able to make various modifications and variations without departing from the spirit and scope of this disclosure. This disclosure is intended to cover these modifications and variations provided that these modifications and variations fall within the scope of protection set forth by the following claims and equivalent technologies.

What is claimed is:

1. A communication method applied to a terminal device comprising:
  receiving first information from a network device;
  determining a hybrid automatic repeat request (HARQ) feedback manner includes skipping both acknowledgement (ACK) feedback and negative acknowledgement (NACK) feedback in response to the first information including an indication to skip both ACK feedback and NACK feedback; and
  performing feedback processing for a first HARQ process based on the HARQ feedback manner,
  the first information includes a radio resource control (RRC) message, the RRC message is for configuring a physical uplink control channel (PUCCH) resource, and the PUCCH resource is for carrying feedback information for a HARQ process corresponding to an SPS resource; and
  in response to the RRC message not carrying configuration information of the PUCCH resource, the RRC message indicates the HARQ feedback manner.

2. The method according to claim 1, wherein the performing feedback processing for the first HARQ process based on the HARQ feedback manner comprises:
  in response to the HARQ feedback manner including the skipping the ACK feedback, and a data packet is received from the first HARQ process, and is successfully decoded, skipping feeding back an ACK to the first HARQ process; or
  in response to the HARQ feedback manner including the skipping the NACK feedback, and the data packet is received from the first HARQ process and fails to be decoded, or the data packet is not received from the first HARQ process, skipping feeding back a NACK to the first HARQ process.

3. The method according to claim 1, wherein:
the first information includes indication information.

4. The method according to claim 3, wherein:
the first HARQ process is a HARQ process corresponding to a semi-persistent scheduling (SPS) resource; and
the receiving indication information from the network device comprises:
  receiving the RRC message from the network device, wherein the RRC message includes the indication information, and the RRC message is for configuring the SPS resource; or
  receiving downlink control information (DCI) from the network device, wherein the DCI includes the indication information, and the DCI is for activating or reactivating the SPS resource.

5. The method according to claim 3, wherein:
the first HARQ process is a HARQ process corresponding to a dynamic scheduling resource; and
the receiving indication information from the network device comprises:

receiving DCI from the network device, wherein the DCI includes the indication information, and the DCI is for scheduling the dynamic scheduling resource.

6. The method according to claim 3, wherein the receiving indication information from the network device comprises:
receiving a first message from the network device, wherein the first message includes the indication information, wherein:
the first message is a packet data convergence protocol (PDCP) layer control message, a radio link control (RLC) layer control message, or a media access control (MAC) layer control message.

7. The method according to claim 3, wherein the receiving indication information from the network device comprises:
receiving a data packet from the network device, wherein the data packet includes the indication information, wherein:
the data packet is sent by using the first HARQ process.

8. An apparatus, comprising:
at least one processor; and
a memory storing instructions for execution by the at least one processor;
wherein, when executed, the instructions cause the at least one processor to perform operations to:
receive first information from a network device;
determine a hybrid automatic repeat request (HARQ) feedback manner includes skipping both acknowledgement (ACK) feedback and negative acknowledgement (NACK) feedback in response to the first information including an indication to skip both ACK feedback and NACK feedback; and
perform feedback processing for a first HARQ process based on the HARQ feedback manner,
the first information includes a radio resource control (RRC) message, the RRC message is for configuring a physical uplink control channel (PUCCH) resource, and the PUCCH resource is for carrying feedback information for a HARQ process corresponding to an SPS resource; and
in response to the RRC message not carrying configuration information of the PUCCH resource, the RRC message indicates the HARQ feedback manner.

9. The apparatus according to claim 8, wherein the performing feedback processing for the first HARQ process based on the HARQ feedback manner comprises:
in response to the HARQ feedback manner including the skipping the ACK feedback, and a data packet is received from the first HARQ process, and is successfully decoded, skip feeding back an ACK to the first HARQ process; or
in response to the HARQ feedback manner including the skipping NACK feedback, and the data packet is received from the first HARQ process and fails to be decoded or the data packet is not received from the first HARQ process, skip feeding back a NACK to the first HARQ process.

10. The apparatus according to claim 8, wherein:
the first information includes indication information.

11. The apparatus according to claim 10, wherein:
the first HARQ process is a HARQ process corresponding to a semi-persistent scheduling (SPS) resource; and
the receiving indication information from the network device comprises:

receive the RRC message from the network device, wherein the RRC message includes the indication information, and the RRC message is for configuring the SPS resource; or
receive downlink control information (DCI) from the network device, wherein the DCI comprises the indication information, and the DCI is for activating or reactivating the SPS resource.

12. The apparatus according to claim 10, wherein:
the first HARQ process is a HARQ process corresponding to a dynamic scheduling resource; and
the receiving indication information from the network device comprises:
receive DCI from the network device, wherein the DCI comprises the indication information, and the DCI is for scheduling the dynamic scheduling resource.

13. The apparatus according to claim 10, wherein the receiving indication information from the network device comprises:
receive a first message from the network device, wherein the first message includes the indication information, wherein:
the first message is a packet data convergence protocol (PDCP) layer control message, a radio link control (RLC) layer control message, or a media access control (MAC) layer control message.

14. The apparatus according to claim 10, wherein the receiving indication information from the network device comprises:
receive a data packet from the network device, wherein the data packet includes the indication information, wherein:
the data packet is sent by using the first HARQ process.

15. An apparatus, comprising:
at least one processor; and
a memory storing instructions for execution by the at least one processor;
wherein, when executed, the instructions cause the at least one processor to perform operations to:
determine a hybrid automatic repeat request (HARQ) feedback manner, wherein the HARQ feedback manner includes at least one situation for skipping acknowledgment (ACK) and negative acknowledgment (NACK); and
send first information to a terminal device, wherein the first information is used by the terminal device to determine the HARQ feedback manner,
the first information includes a radio resource control (RRC) message, the RRC message is for configuring a physical uplink control channel (PUCCH) resource, and the PUCCH resource is for carrying feedback information for a HARQ process corresponding to an SPS resource; and
in response to the RRC message not carrying configuration information of the PUCCH resource, the RRC message indicates the HARQ feedback manner.

16. The apparatus according to claim 15, wherein:
the first information includes indication information.

17. The apparatus according to claim 16, wherein the sending first information to the terminal device comprises:
send a first message to the terminal device, wherein the first message includes the indication information, and the first message is the RRC message, a packet data convergence protocol (PDCP) layer control message, a radio link control (RLC) layer control message, a media access control (MAC) layer control message, or downlink control information (DCI); or send a data packet to the terminal device, wherein the data packet includes the indication information.

18. The apparatus according to claim 17, wherein the RRC message is for configuring a semi-persistent scheduling (SPS) resource or configuring a logical channel corresponding to a first service; or the DCI is for activating or reactivating an SPS resource or scheduling a dynamic scheduling resource.

19. The apparatus according to claim 15, wherein:

the first information includes DCI, and a DCI format or a DCI scrambling manner is for indicating the HARQ feedback manner.

\* \* \* \* \*